United States Patent [19]
Dike et al.

[11] Patent Number: 5,539,739
[45] Date of Patent: Jul. 23, 1996

[54] ASYNCHRONOUS INTERFACE BETWEEN PARALLEL PROCESSOR NODES

[75] Inventors: Charles Dike, Hillsboro; Robert Gatlin, St. Helens; Jerry Jex, Forest Grove; Craig Peterson, Portland; Keith Self, Aloha; Jim Sutton, Portland, all of Oreg.

[73] Assignee: Intel Corporation, Santa Clara, Calif.

[21] Appl. No.: 315,284

[22] Filed: Sep. 29, 1994

[51] Int. Cl.$^6$ ........................................................ H04L 7/04
[52] U.S. Cl. ...................... 370/60.1; 370/105.3; 370/108; 375/372
[58] Field of Search .............................. 371/39.1; 370/41, 370/84, 94.1, 94.2, 100.1, 105.3, 108, 60.1; 375/354, 371, 372

[56] References Cited

U.S. PATENT DOCUMENTS

| | | | |
|---|---|---|---|
| 4,736,465 | 4/1988 | Bobey et al. | 370/94.3 |
| 5,239,544 | 8/1993 | Balzano et al. | 370/60.1 |
| 5,274,680 | 12/1993 | Sorton et al. | 370/105.3 |
| 5,359,600 | 10/1994 | Ueda et al. | 370/60.1 |
| 5,428,609 | 6/1995 | Eng et al. | 370/60.1 |

*Primary Examiner*—Benedict V. Safourek
*Attorney, Agent, or Firm*—Blakely, Sokoloff, Taylor & Zafman

[57] ABSTRACT

An asynchronous interface enabling a processor node operating at a first clocking frequency to transfer and receive information from a communications network operating at a second clocking frequency. The asynchronous interface comprises an input synchronizer and an output synchronizer. The input synchronizer asynchronously receives a first plurality of information packets from the processor node and synchronously transfers the first plurality of information packets into the communications network. The output synchronizer, however, synchronously receives a second plurality of information packets from the communications network and asynchronously transfers the second plurality of information packets into the processor node. Both the input and output synchronizers are coupled between the communications network and the processor node.

37 Claims, 13 Drawing Sheets

ASYNCHRONOUS INTERFACE BETWEEN PARALLEL PROCESSOR NODES

BACKGROUND OF THE INVENTION

1. Field of the Invention

The present invention relates to the field of data transfer. More specifically, the present invention relates to an asynchronous interface enabling both a physically distributed, synchronous communications network and processor nodes, coupled to the communications network, to operate at their maximum clocking frequencies.

2. Background Art Related to the Invention

In recent years, the computer industry has begun to fully appreciate substantial performance advantages in transferring information (i.e., data, addresses and control information) between processor nodes. A "processor node" is generally defined as an apparatus comprising a central processing unit ("CPU"), associated memory and interface circuitry. These processor nodes typically are coupled separately or collectively to a conventional interconnect component which, in turn, is coupled to a synchronous communications network i.e., a physically distributed medium being clocked at a predetermined network clocking frequency.

Traditionally, for the synchronous communications network to operate properly, each processor node, coupled to the network through conventional interconnect components, is required to operate at the network clocking frequency. This requirement places burdensome restrictions on the overall performance and architecture of the communications network. Due to continual advancements in multi-processing technologies and broader usage of synchronous communications networks for high-speed parallel-processing applications i.e. supercomputers, a number of performance-related disadvantages have emerged. One such disadvantage is that processor nodes, which may operate at a maximum clocking frequency greater than the network clocking frequency, would now be required to operate at the network clocking frequency. As a result, the advanced processor nodes would not achieve optimal performance.

Another disadvantage relates to difficulties in upgrading the supercomputer. One reason for such difficulty is caused by the conventional interconnect components. More specifically, the conventional interconnect components usually are coupled to a back-plane of the supercomputer. Thus, in order to upgrade the network of the supercomputer, for example enhancing its clocking frequency to accommodate advanced processor nodes, the back-plane of the supercomputer must be replaced which is extremely labor intensive. Rather, businesses usually replace the entire supercomputer.

Another basis for such difficulty occurs because the performance of the synchronous communications network of the supercomputer generally is based on the slowest processor node. As processor nodes become more advanced and operate at higher clocking frequencies, it is becoming difficult to substitute these advanced processor nodes for prior processor nodes without a complete reconfiguration of the communications network in order to maintain existing data and clock phase relationships. It is contemplated that even if the advanced processor node is adapted to the communications network, it may have no appreciable effect on the overall performance of the supercomputer provided there exists a slower processor node. This disadvantage also exists in connection with adapting customized processor nodes and standard processor nodes to the same synchronous communications network. Since customized processor nodes usually operate at unique operating frequencies, they also are difficult to implement on the synchronous communications network, and if adaptable, may require limiting the clocking frequency (and performance) of either the custom processor node, the standard processor node or both types of processor nodes through pseudo-asynchronous interfaces.

In order to mitigate these above-identified disadvantages, "pseudo-asynchronous" interfaces are being employed between the synchronous communications network of the supercomputer and each parallel processor node. A "pseudo-asynchronous" is generally a combination of discrete logic devices which adds unnecessary latency through redundant buffering in order to augment or limit its network clocking frequency by "m/n", where "m" and "n" are arbitrary integers. Thus, the pseudo-asynchronous interface is not truly asynchronous because it has a known relationship with the network clocking frequency so that it inherently possesses the same problems in maintaining a clock phase relative to data as any synchronous communications network with nodes that are physically and electrically separated by a large distance.

Therefore, in light of the foregoing, it is appreciated that there exists a need for reducing or eliminating the disadvantages associated with conventional physically distributed, synchronous communications network employing multiple processor nodes operating at identical or different operating frequencies. Hence, it is an object of the invention to provide an asynchronous interface which allows each processor node to operate at its maximum clocking frequency instead of at a clocking frequency which conforms to the other processor nodes and the communications network.

It is further an object of the present invention to provide an apparatus and method which enables the synchronous communications network to operate at its maximum bandwidth without consideration of the processor node clocking frequency.

It is still another object of the present invention to provide an asynchronous interface embedded inside a routing component to simplify the clocking scheme for the network in precluding distribution of the clock.

It is another object of the present invention to provide an apparatus which support incremental upgrades of a processor node without altering the network clocking frequency.

BRIEF SUMMARY OF THE INVENTION

The present invention relates to an asynchronous interface comprising an input synchronizer and an output synchronizer capable of operating in either "interlock" or "stream" mode. In "interlock" mode, only one request may be outstanding prior to receipt of an acknowledge. In "stream" mode, however, multiple requests may be pending. The input synchronizer, being coupled between a processor node and interconnect medium of a communications network, includes a first asynchronous interface module and a first virtual pin buffer. The first asynchronous interface module stores information packets being asynchronously transmitted from the processor node and synchronously transmits the information packets therefrom to be transferred through the interconnect medium. The first virtual pin buffer converts the information packets into packets utilizing a protocol familiar to the communications network.

To accomplish this transmission from an asynchronous domain to a synchronous domain, the first asynchronous interface module includes (i) a first storage element for storing the first plurality of information packets, (ii) a write control circuit and (iii) a first control circuit. The write control circuit signals the first control circuit via a write clocking line to advance the write pointer so that the information packets are sequentially written into the first storage element. The first control circuit controls writing of the information packets into the first storage element through a write pointer and reading of the information packets from the first storage element through a read pointer. Moreover, the first control circuit de-asserts a first control signal, input into the write control circuit, upon determining that a predetermined number of the plurality of bit slices are full and have not been unread by the first virtual pin buffer. This first control signal causes the write control circuit to temporarily discontinue advancing the write pointer.

The output synchronizer, being coupled between the interconnect medium of the communications network and the processor node, includes a second virtual pin buffer and a second asynchronous interface module. The second virtual pin buffer synchronously transmits other information packets transferred from another processor node into a second asynchronous interface module.

The second asynchronous interface module stores these information packets and for asynchronously transmits them into the processor node. To perform this transmission, the second asynchronous element includes (i) a second storage element for storing the information packets, (ii) a second control circuit and (iii) a request generator.

The second control circuit controls writing and reading of these information packets into and from the second storage element through a second write pointer and a second read pointer, respectively. Moreover, the second control circuit signals the status of the second storage element i.e., whether its "full" or "empty". When the second storage element is empty, the request generator does not generate any further requests; however, when full, depending on the operating mode of the second asynchronous interface module, no more information may be written into the second storage element but more read requests may be initiated.

The request generator transmits an asynchronous read request signal into the processor node to indicate that one of said second plurality of information packets is available to be read by the processor node. The request generator further transmits an asynchronous read clock pulse into the second control circuit to advance the second read pointer.

BRIEF DESCRIPTION OF THE DRAWINGS

The objects, features and advantages of the present invention will become apparent from the following detailed description of the present invention in which.

DETAILED DESCRIPTION OF THE INVENTION

An asynchronous interface coupling a synchronous communications network to one of several parallel processor nodes having different timing configurations as well as the method associated with the operation of the asynchronous interface are described herein. In the following detailed description, numerous specific details are set forth, such as specific elements of an asynchronous interface, certain control and data lines coupling these specific elements and the like. However, it is apparent to one skilled in the art that the present invention can be practiced with different components or through alternative coupling without deviating from the spirit and scope of the present invention.

In the detailed description, a number of terms and symbols are frequently used to describe certain types of circuits and signal representations herein. An element, circuit or component (i.e., a collection of circuits) is "self-timed" (i.e., asynchronous) if it has no frequency or phase relationship with any fixed frequency clock. A "FIFO" element is defined as a first-in, first-out buffering element having a plurality of bit slices as typically employed in most conventional computer architectures. A "local processor node" is defined as an apparatus comprising at least a CPU, associated memory and a network interface component ("NIC") which, inter alia, receives synchronous data from the CPU and converts the synchronous data into self-timed data for transmission to an input synchronizer of an asynchronous interface in order to obtain a higher data transfer rate. A "pointer" is defined as a signal from a select line selecting a particular storage location in a storage element such as a FIFO element.

With respect to signal representations, a signal or bit is "asserted" if it exists in a "logic "1" state and is "de-asserted" is it exists in a logic "0" state. A "packet" is generally defined as a number of information bits (i.e., binary values of address, data or control information) which are transferred at a given time. The packet may be further categorized according to its contents e.g., a "data packet" being a number of data bits. A "message" is generally defined as a packet combined with a routing header identifying which processor node is selected to receive the packet. A "data transfer" is a series of events necessary to transfer data and other information between a processor node and a router. Lastly, a symbol "#" represents that a particular signal or bit is "active-low".

Figure 1:
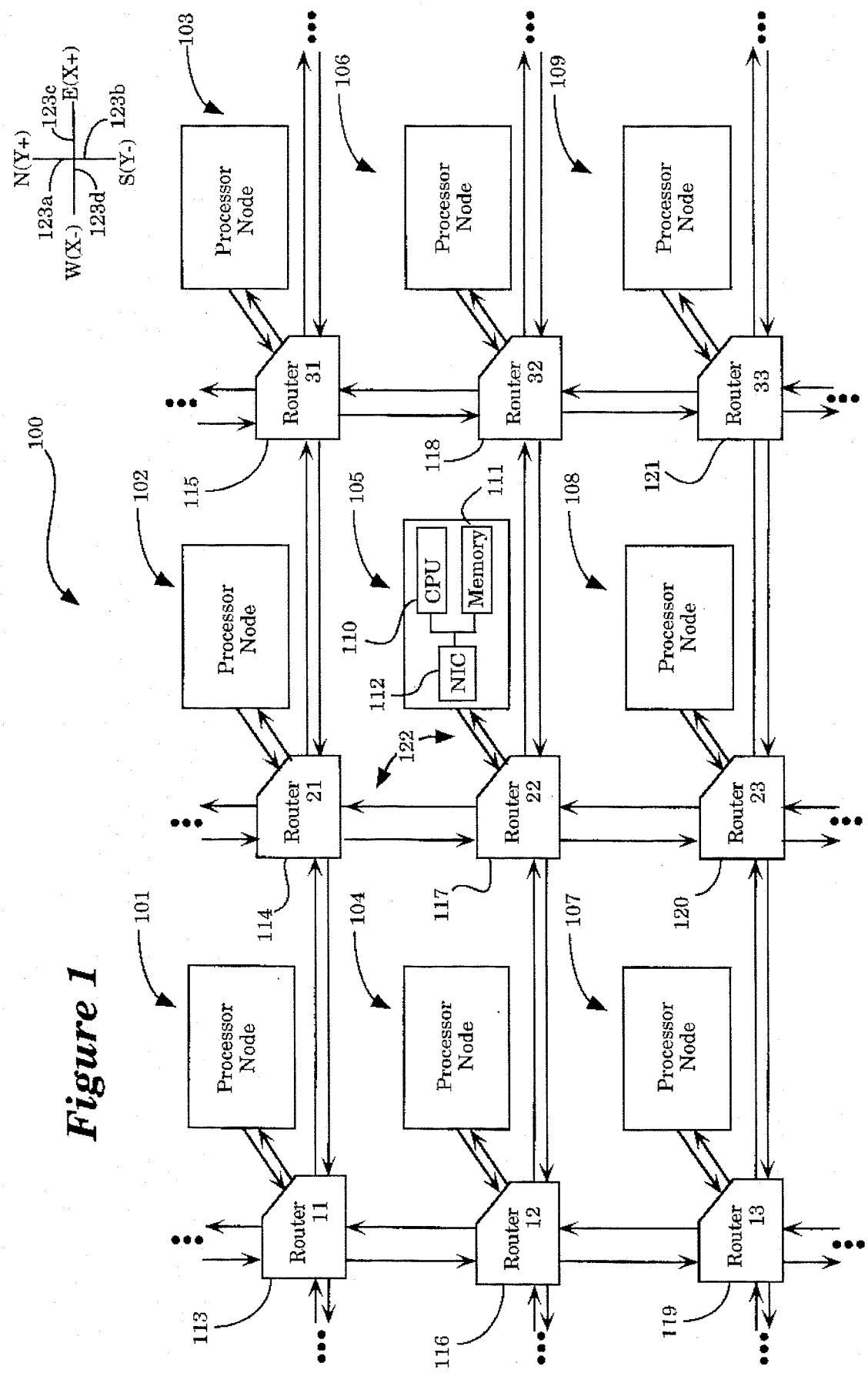
FIG. 1 is a block diagram of an embodiment of a synchronous communications network as a two-dimensional mesh wherein each local processor node is coupled to its corresponding local routing component.

Referring to FIG. 1, an illustrative embodiment of a synchronous communications network as a two-dimensional mesh utilizing the present invention is shown. In this embodiment, the synchronous communications network 100 comprises a plurality of local processor nodes 101-109. Although these local processor nodes 101-109 may differ in function, each of these nodes includes a CPU 110, associated memory 111 and a NIC 112 as illustrated for a first local processor node 105. Each NIC of these local processor nodes 101-109 is coupled to a corresponding local routing components 113-121 labeled "Router$_{xy}$". The arbitrary numbers "x" and "y" are associated with the column and row position of the local routing components 113-121 within the two-dimensional mesh forming the synchronous communications network 100. Each local routing component is coupled to its adjacent local routing components and its corresponding processor node through uni-directional point-to-point interconnect lines 122, as shown for a first local routing component 117, to form a parallel processing system operating as a supercomputer. For example, the first local routing component 117 is able to (i) receive messages from the first local processor node 105 or one of its adjacent routing components 114, 116, 118 or 120 and (ii) transmit messages from the first local processor node 105 to one of its adjacent routing components 114, 116, 118 or 120 or from one of its adjacent routing components 114, 116, 118 or 120 to a different adjacent routing component.

Referring still to FIG. 1, the synchronous communications network 100 enables a message to propagate in one of four different directions; namely, "North", "East", "West" and "South" as referenced through arrows 123a-123d. In this chosen mesh topology, the North direction 123a corresponds to a positive Y-axis ("Y+") direction while the South direction 123b corresponds to a negative Y-axis ("Y−") direction. Additionally, the East direction 123c corresponds to a positive X-axis ("X+") direction and the West direction 123d corresponds to a negative X-axis ("X−") direction.

Figure 2:
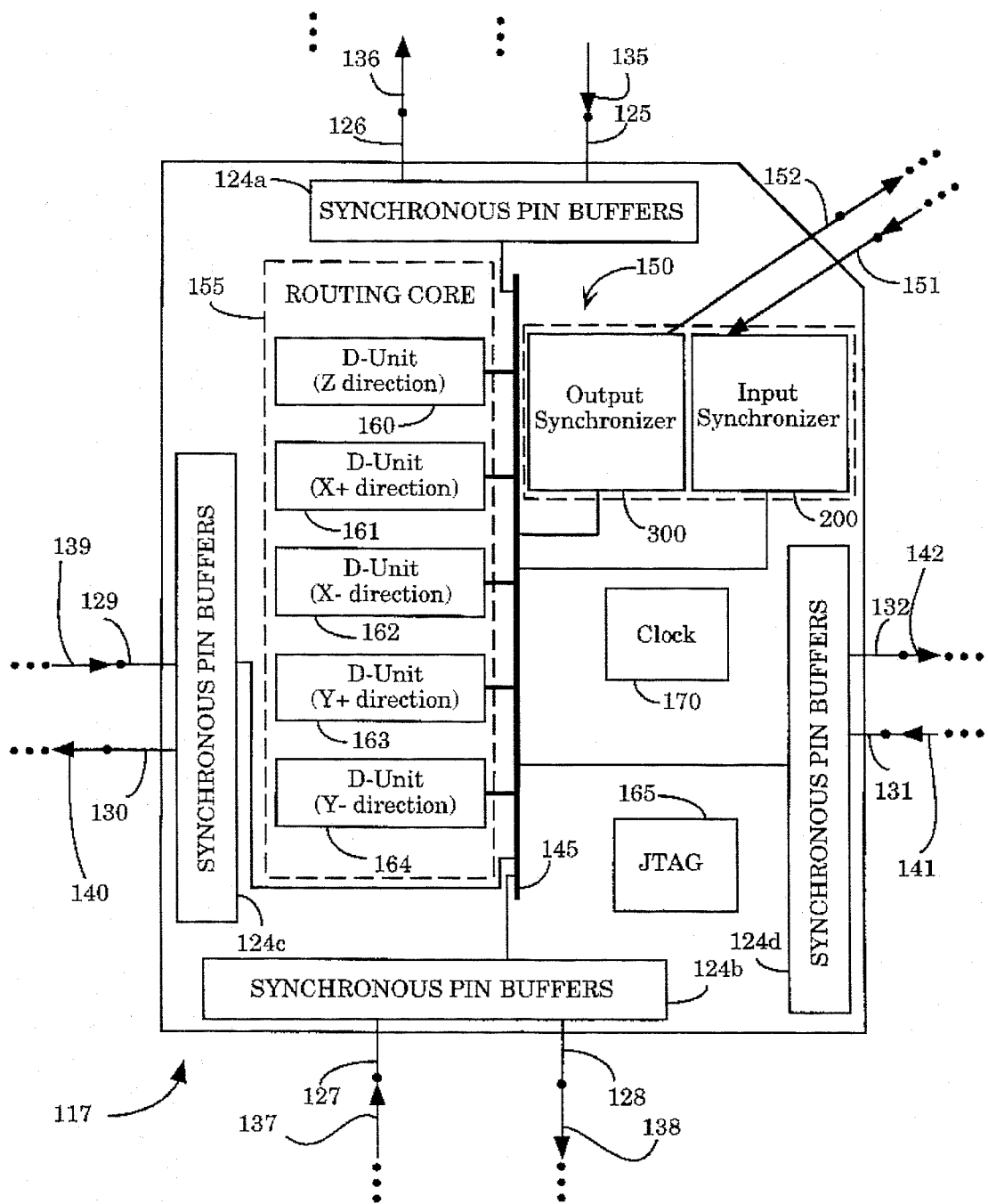
FIG. 2 is a block diagram of an embodiment of the first local routing component including an asynchronous interface coupling the first local processor node to an internal bus monitored by a routing core of the local routing component.

Referring now to FIG. 2, an illustrative embodiment of the first local routing component 117 is shown since it is identical in physical construction to any other local routing components 113, 114, 115, 116, 118, 119, 120 or 121 in the network 100. The first local routing component 117 includes four pairs of uni-directional input and output ports; namely, North 125-126, South 127-128, East 129-130 and West 131-132 input and output ports, respectively. These input and output ports are collectively referred to as "NEWS" ports. Each pair of NEWS input and output ports 125-126, 127-128, 129-130 and 131-132 is coupled at one end to a corresponding synchronous pin buffer 124a-124d being routed to an internal bus 145. Additionally, each of these pairs is coupled at its other end to corresponding pairs of uni-directional interconnect lines 135-136, 137-138, 139-140 and 141-142 which are, in turn, coupled to adjacent routing components 114, 120, 116 or 118 of FIG. 1, respectively. Thus, the first local routing component 117 is able to receive messages from and transfer messages to its adjacent routing components 114, 116, 118 or 120.

The first local routing component 117 comprises an asynchronous interface 150, a routing core 155, a Joint Test Action Group ("J-TAG") register 165 and an internal clock 170. Embedded within the first local routing component 117 isolating it from external board noise, the asynchronous interface 150 enables reliable information transfer between two separate synchronous domains, being the first local processor node and the communications network in this embodiment. The asynchronous interface 150 includes an input synchronizer 200 and an output synchronizer 300 in which components forming the synchronizers may operate in either an interlock mode or a stream mode (discussed below). The input synchronizer 200 synchronizes self-timed data from the NIC of the first processor node and transfers the synchronized data through a uni-directional input port 151 to the routing core 155 for use by the communications network. The output synchronizer 300, however, receives synchronized data from the routing core 155 via an uni-directional output port 152 and transfers self-timed data to the NIC of the first processor node.

The routing core 155, coupled to the internal bus 145, including a number of data routing units 160-164 (referred to as "D-Units"), operating individually as storage elements and collectively as an arbiter by monitoring routing headers of messages placed on the internal bus 145. Based on its determination, the routing core 155 selects the manner in which the message is output from the local routing component 117 i.e., the transmission path through one of the five output ports 126, 128, 130, 132 or 152. For example, if the first local processor node transmits a message through the input synchronizer 200 and onto the internal bus 145 for transmission to another processor node, the routing core 155 would select a proper output port 126, 128, 130 or 132 for the message. Alternatively, in the event that the message is input into one of the NEWS input ports 125, 127, 129 or 131 from another routing component, the routing core 155 determines the destination of the message. If the message is directed toward the first local processor node, the routing header of the message is removed allowing the packet to be input into the output synchronizer 300 for transmission to the first local processor node. If, however, the message is directed toward another processor node, the message is transmitted through one of the NEWS output ports 126, 128, 130 or 132.

The other internal components employed in the local routing component 117 operate as follows. The J-TAG register 165 (IEEE standard 1149) is employed for configuring synchronizer latency and selecting an operating mode of the asynchronous interface 150. In addition, the internal clock 170, operating at a network clocking frequency ("NET_CLK") approximately equal to 200 megahertz, synchronizes information transmitted from the first local processor node.

Figure 3:
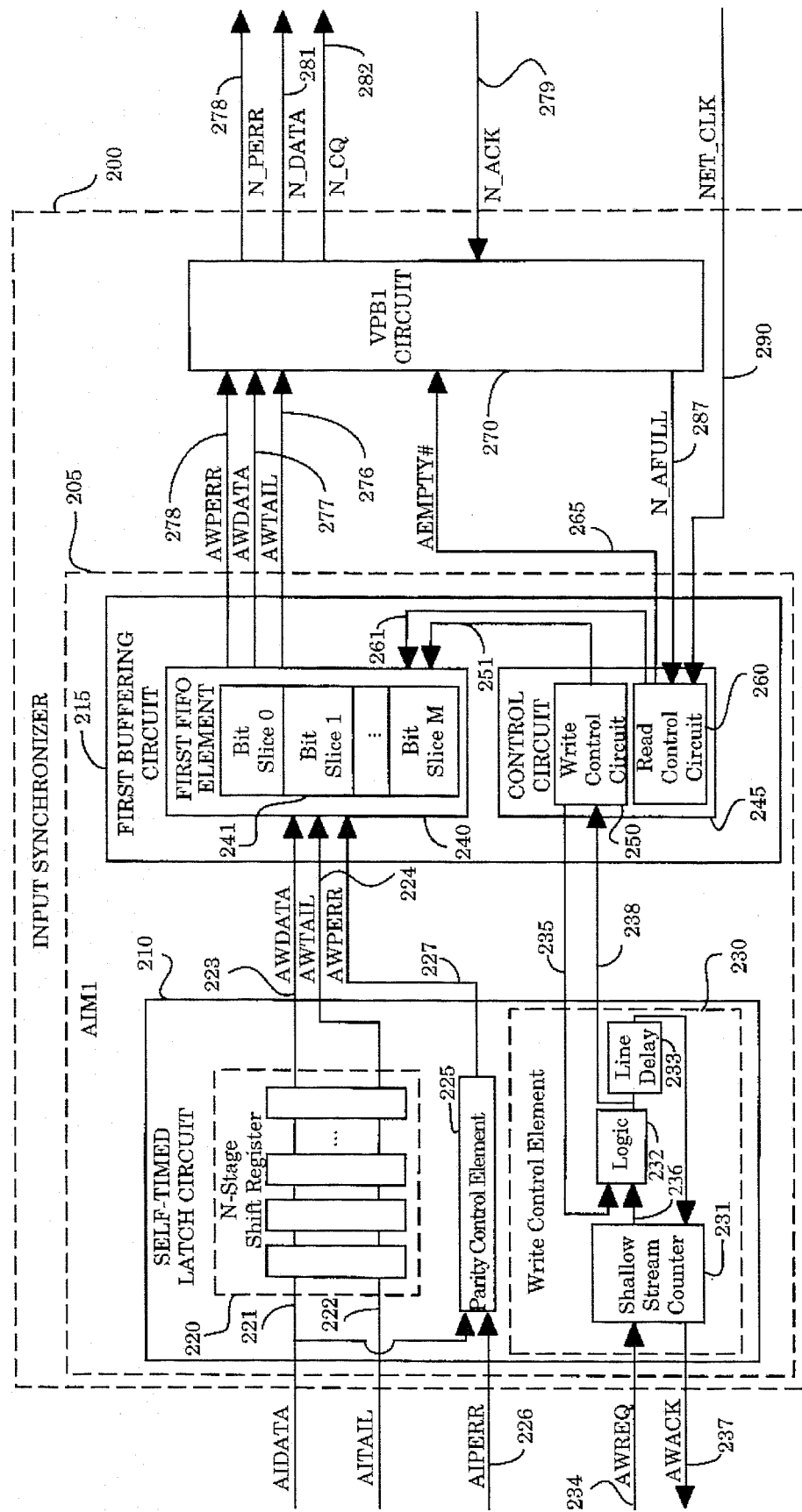
FIG. 3 is a block diagram of an embodiment of the input synchronizer of the asynchronous interface, wherein the input synchronizer comprises a first virtual pin buffer unit and a first asynchronous interface module which includes a self-timed latch circuit and a first buffering circuit.

Referring to FIG. 3, an illustrative embodiment of the input synchronizer 200 of the asynchronous interface 150 is shown. Coupling the NIC of the first local processor node to the routing core of the first local routing component, the input synchronizer 200 comprises a first asynchronous interface module ("AIM1") 205 and a first virtual pin buffer ("VPB1") circuit 270 clocked at NET_CLK transmitted through a clock line 290. The AIM1 205 receives a number of information packets from a self-timed NIC according to a request/acknowledge handshaking protocol and synchronizes the transmission of these information packets to the VPB1 circuit 270. Thereafter, the VPB1 circuit 270 converts the information packet into appropriate signals in accordance with an empty/full handshaking protocol.

The AIM1 205 includes a self-timed latch circuit 210 and a first buffering circuit 215 which includes a first FIFO element 240 being controlled by a first control circuit 245. The self-timed latch circuit 210 includes a self-timed, N-stage shift register 220 to enable faster overall data transfer in a self-timed circuit, a parity control element 225 to ensure accurate data transfer and a write control element 230 for controlling the writing of information into the first FIFO element 240. During a data transfer from the first local processor node to another local processor node, the NIC of the first local processor node 105 inputs a number of self-timed n-bit data ("AIDATA") packets, where "n" is an arbitrary number preferably equal to "16", into the N-stage shift register 220 through an input data bus 221, preferably a 16-bit wide data bus. Concurrently with each data transmission, the NIC transmits self-timed control information, for example, a "AITAIL" bit into the N-stage shift register 220 through an input transfer termination bus 222. When asserted, the AITAIL bit indicates that the AIDATA packet is a final data packet of the data transfer.

After a predetermined amount of delay is imposed by the N-stage shift register 220, the delayed AIDATA packet and the AITAIL bit (referred to as "AWDATA" and "AWTAIL", respectively) are output from the N-stage shift register 220 via an output data bus 223 and an output termination bus 224. As a result, the AWDATA packet and AWTAIL bit are ready to be latched into the first FIFO element 240 and subsequently read by the VPB1 circuit 270. In the event that the first FIFO element 240 is "full" (i.e., each bit slice of the first FIFO element 240 contains valid information), the N-stage shift register 220 may collectively store "N" AIDATA packets (where "N" is an arbitrary whole number preferably equal to "4") and their associated AITAIL bits in order to support a higher data transfer rate in "stream" mode as discussed in FIGS. 6A and 6B.

The parity control element 225 monitors the incoming AIDATA to detect whether a parity bit error occurs. A plurality of parity select bits labeled "AIPERR" are input into the parity control element 225 through parity input lines 226 to select a chosen type of parity (i.e., "even" or "odd", "high" or "low", etc.). Upon detecting a parity bit error, the parity control element 225 produces an active parity error ("AWPERR") bit via the parity output line 227 and transfers the AWPERR bit to be latched in a selected bit slice in combination with its associated AWDATA packet and AWTAIL bit. The AWDATA packet in combination with the AWTAIL and AWPERR bits are collectively referred to as an "information packet". It is contemplated, however, that the information packets may include additional information or exclude control information such as AWTAIL and/or AWPERR.

The first local processor node 105 is further coupled to the write control element 230 including a shallow stream counter 231, a logic element 232 (operating as an AND gate) and a programmable delay line element 233. The first local processor node 105 inputs an asynchronous write data transfer request ("AWREQ") signal into the shallow stream counter 231 through a request line 234. The AWREQ signal corresponds to a particular AIDATA packet. The shallow stream counter 231, being a plurality of combinatorial logic elements, monitors the number of outstanding AWREQ signals, translates the incoming AWREQ signal into an asynchronous write pointer clock ("AWPCLK") pulse and generates an asynchronous write acknowledge ("AWACK") signal through a write clock line 238 in response to the AWREQ signal if an asynchronous "almost full" ("AFULL#") output is asserted (i.e., logic "1"). In the event that the AFULL# output is de-asserted, the shallow stream counter 231 generates up to "N-1" AWACK signals enabling each stage of the N-stage shift register 220 to store information but it does not generate the $N^{th}$ AWACK signal in order to prevent overflow of the N-stage shift register 220. Thereafter, when the AFULL# output is asserted, the shallow stream counter 231 continues to generate AWPCLK pulses enabling the N-stage shift register 220 to transfer the previously stored information packets into the first FIFO element 240 prior to asserting the $N^{th}$ AWACK signal.

The logic element 232 receives as input the AWPCLK pulse via an asynchronous clock pulse line 236 along with an AFULL# output via a control line 235 from the write control circuit 250. The AWPCLK pulse informs the write control circuit 250 to latch the information packet into a particular bit slice 241 of the first FIFO element 240 currently selected by a write pointer produced by the first control circuit and to advance the write pointer to select a different bit slice for latching subsequent information packets therein. The AFULL# output, when de-asserted, indicates that a majority of the bit slices forming the first FIFO element 240 contain valid (i.e., non-read) information packets. By inputting the de-asserted AFULL# output into the logic element 232, it precludes the AWPCLK pulse from being transferred through the logic element 232 until AFULL# is de-asserted. This prevents additional information packets from being written into the first FIFO element 240.

In the event that the self-timed latch circuit 210 is operating in the interlock mode, the shallow stream counter 231 immediately outputs the AWACK signal into the NIC of the first local processor node through an acknowledge line 237 indicating that an incoming information packet would be latched by the first FIFO element 240, except when AFULL# is de-asserted and more than "N-1" AWREQ signals have been input into the shallow stream counter 231. However, if the shallow stream counter 231 is operating in the stream mode, the shallow stream counter 231 refrains from immediately outputting the AWACK signal. Instead, the programmable delay line element 233, being approximately 4–19 nanoseconds ("ns"), is utilized to delay the transmission of the AWACK signal. More specifically, the shallow stream counter 231 outputs the AWACK signal after the AWPCLK pulse is received as a feed back signal into the shallow stream counter 231 from the programmable delay line element 233. However, it is contemplated that an external delay element may be implemented if the delay line element 233 does not provide sufficient delay to avoid improper assertion of the AWACK signal responsive to the AWREQ signal.

The first buffering circuit 215 includes the first FIFO element 240 having "M" bit slices (where "M" is preferably equal to "20") each being approximately 25-bits in length where each bit is representative of a transparent latch. These bit slices are controlled by the first control circuit 245. Clocked by the write control element 230, the write control circuit 250 of the first control circuit 245 maintains the write pointer through assertion of one of the write pointer select lines 251 in order to select one bit slice of the plurality of bit slices, for example a selected bit slice 241, which is available to temporarily store an information packet transmitted by the first local processor node. After writing the information packet into the selected bit slice 241, the write control circuit 250 increments the write pointer so that a subsequent information packet is written into a different bit slice.

Moreover, the read control circuit 260 of the first control circuit 245, being clocked by the NET_CLK through clock line 290, maintains a read pointer representing a bit slice to be read by the VPB1 circuit 270 through assertion of one of the read select lines 261. After the contents from that bit slice are read, the read pointer is advanced to a next bit slice, unless the VPB1 circuit 270 signals the AIM1 205, specifically the read control circuit 260, not to transmit data to the VPB1 circuit 270 by asserting an almost-full ("N_AFULL") signal discussed below.

In light of the fact that the asynchronous interface 150 is interposed between two different clock domains, reading and writing is going to occur at different rates. As a result, if the writing rate is greater than the reading rate, the first FIFO element 240 becomes filled with valid data. Although constructing the FIFO element 240 with "M" bit slices may mitigate certain situations where the first FIFO element 240 is full, it is apparent that the input synchronizer 200 must be able to generate the AFULL# signal indicating that the first FIFO element 240 is "almost full" to temporarily cease transmission of information packets into the first FIFO element 240 by the first local processor node 105. This is accomplished through the first control circuit 245.

Figure 4:
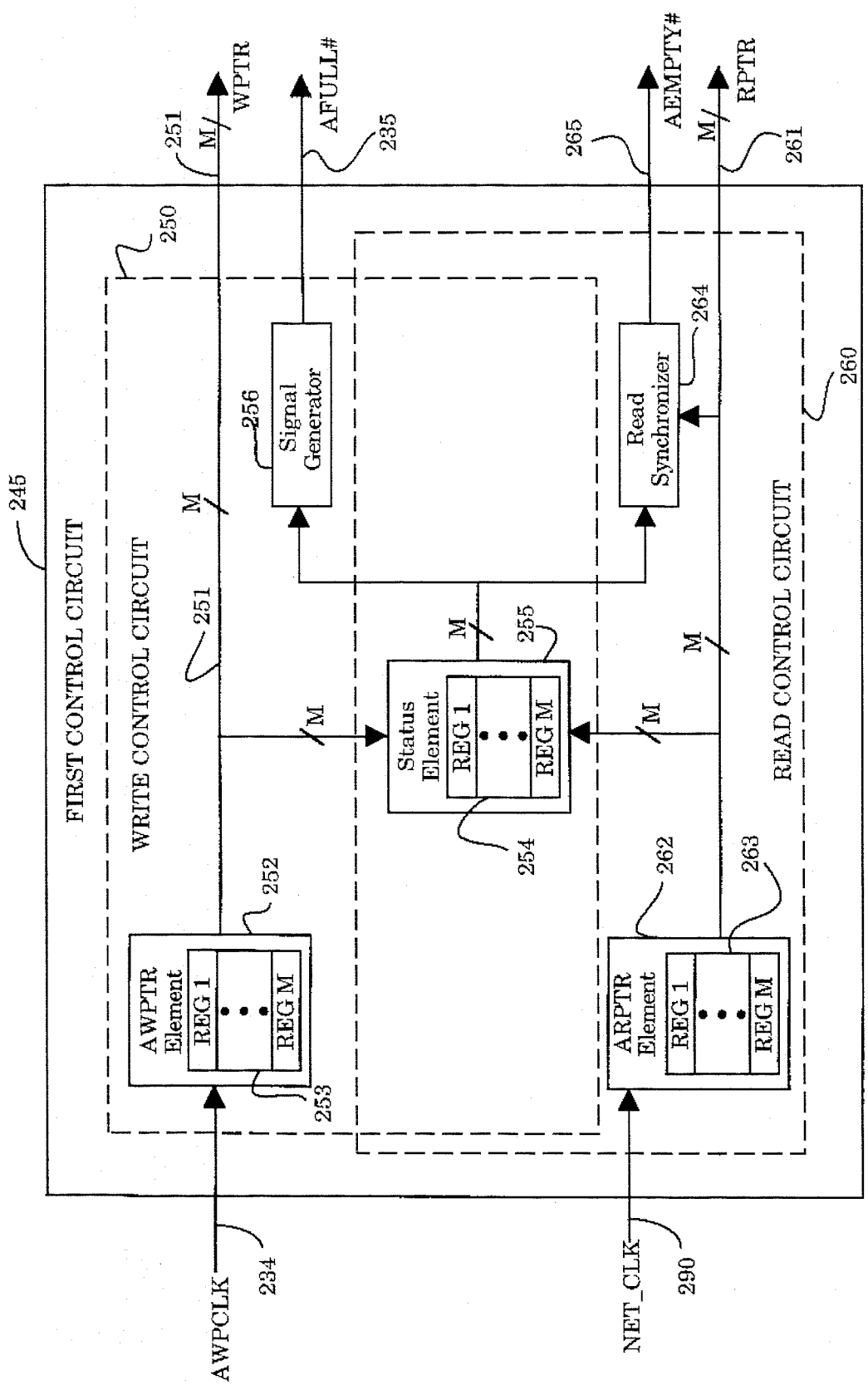
FIG. 4 is a block diagram of a first control circuit employed in the first buffering circuit of FIG. 3 for controlling the transmission of information from the first local processor node to the routing core of the first local routing component.

Referring now to FIG. 4, an illustrative embodiment of the first control circuit 245 is shown. The first control circuit 245 comprises a write control circuit 250 including an asynchronous write pointer ("AWPTR") element 252 including "M" registers ("REG") 253, collectively operating as a ring counter clocked by the AWPCLK pulse. Each register 253 of the AWPTR element 252 is coupled correspondingly to a "set" input port of each "M" status registers 254 employed within a status element 255 and a corresponding "M" bit slices of the first FIFO element through "M" write pointer select lines 251 forming the write pointer ("WPTR"). Thus, during a write request, when a certain register in the AWPTR element 252 is asserted, its associated write pointer select line propagates an asserted write signal to set its corresponding status register and to select a bit slice within the first FIFO element corresponding thereto. These "M" status registers 254 maintain the number of valid information packets temporarily stored in the bit slices of the first FIFO element and the bit-slice location of these valid information packets.

The first control circuit 245 further comprises a read control circuit 260 including an asynchronous read pointer ("ARPTR") element 262, including "M" registers 263, also collectively operating as a ring counter but being clocked at NET_CLK. Similar to the AWPTR element 252, each register 263 of the ARPTR element 262 is coupled correspondingly to a "reset" input port of each "M" status registers 254 of the status element 255 and to associated "M" bit slices of the first FIFO element through "M" read pointer select lines 261 forming the read pointer ("RPTR"). As a result, when a certain register 263 in the ARPTR element 262 is activated, the read pointer select lines 261 coupled to that register propagates an asserted read signal to reset its corresponding status register 263 and its synchronizers within a read synchronizer 264 as well as to select its corresponding bit slice in the first FIFO element.

The status registers 254 are coupled to a signal generator 256 and a read synchronizer 264. The signal generator 256 de-asserts the AFULL# signal line if a predetermined number of status registers 254 are set, preferably over 60% of the status registers 254. This causes the assertion of the AWACK signal to be delayed to preclude writing of information packets into the first FIFO element. The read synchronizer 264 de-asserts an asynchronous empty ("AEMPTY#") signal input into the VPB1 circuit 270 through an AEMPTY# control line 265 indicating that the first FIFO element does not contain any valid information packets. The AEMPTY# signal is synchronized with NET_CLK because it is being input into the routing core. The N_AFULL signal causes the read pointer element to preclude the first FIFO element for transferring data to the routing core.

Figure 5A:
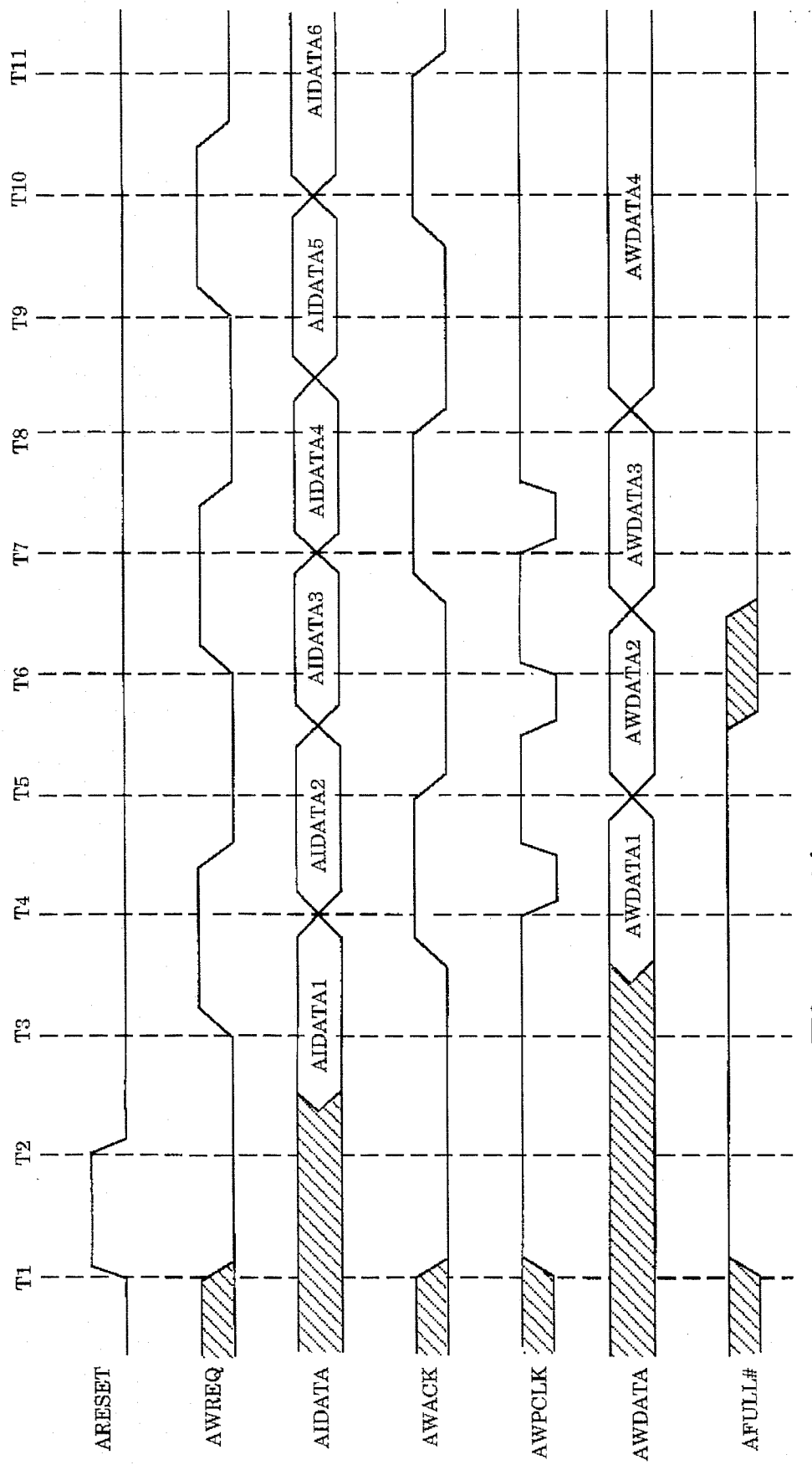
FIGS. 5A and 5B is a timing sequence diagram of certain control and data signals of the self-timed latch circuit undergoing a data transfer in interlock mode.
Figure 5B:
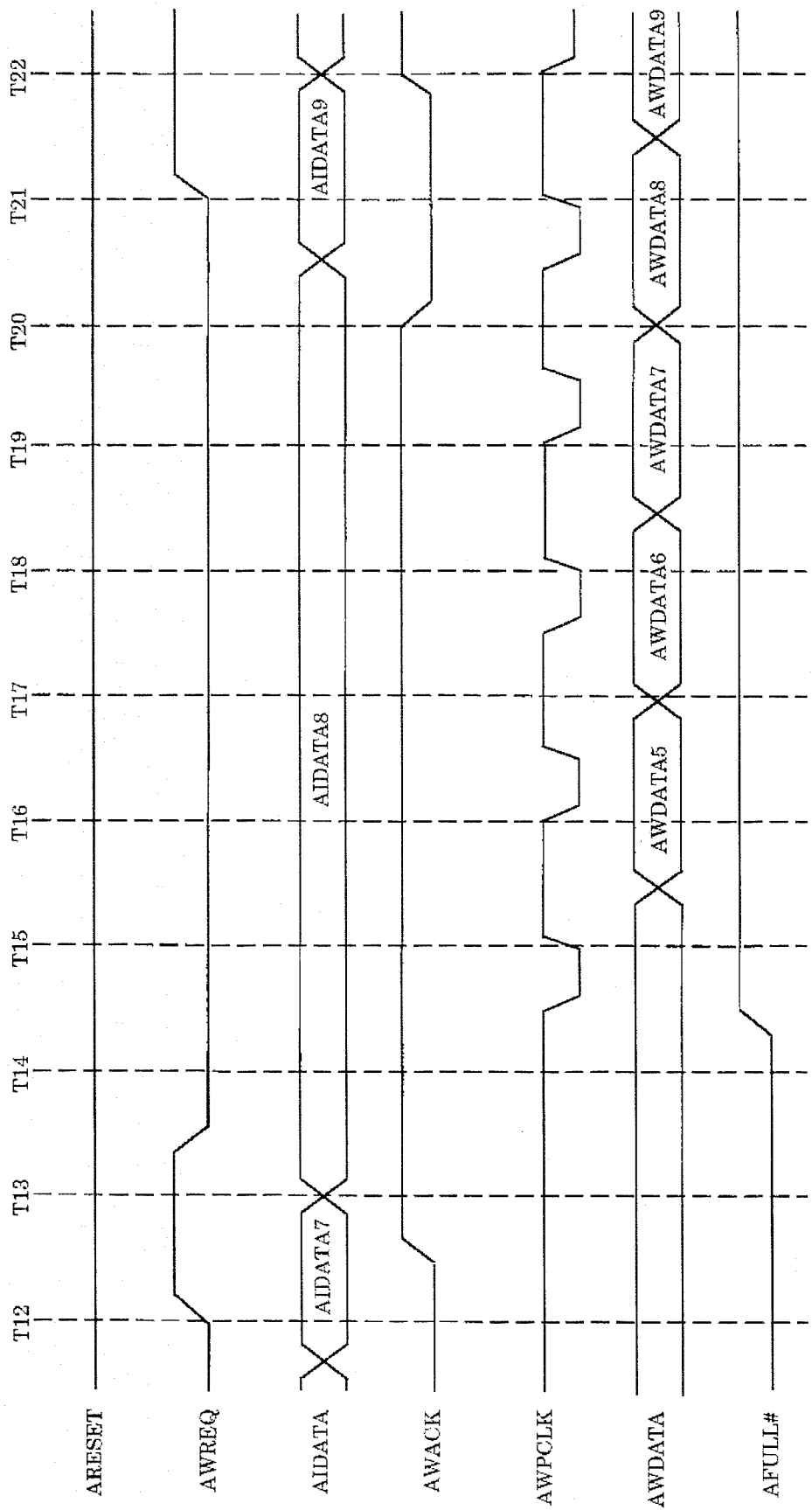

FIGS. 5A and 5B illustrates the timing sequences of the preferred embodiment of the AIM1 operating in an interlock mode. Since the AIM1 is generally asynchronous in operation, the timing relationships are illustrated through time units, not bus cycles. As shown at time unit T1, an asynchronous reset ("ARESET") is asserted to reset pointers which is well known in the art. At approximately time unit T3, the first local processor node transmits a data packet into the NIC which is now available to the AIM1. Detecting that the data packet is available to the AIM1, the NIC asserts (i.e. toggles) an AWREQ signal, being a level transition signal input into the write control element of the self-timed latch circuit, indicating that data is available and transmits a first data packet AIDATA1 into the N-stage shift register. Since the AFULL# signal is asserted, the write control element immediately toggles the AWACK signal in response to the AWREQ signal. The assertion of the AWACK signal enables the NIC to transmit the next AWREQ signal since only one outstanding AWREQ is allowed in interlock mode. At time unit T4, the AWPCLK is de-asserted allowing AWDATA1 to pass through the first FIFO element. On the rising edge of AWPCLK, the write pointer is advanced selecting another bit slice for storage of information packets from the NIC.

While the first data packet AIDATA1 propagates through the four-stage shift register, denoted by the time difference between AIDATA1 and AWDATA1, the write control element is translating the first AWREQ signal into the AWPCLK pulse for clocking AWDATA. The AWDATA1 is latched into the first buffering unit prior to time unit T4 and while AWPCLK is asserted (i.e., logic "1").

The above-described timing sequence continues until the write control circuit de-asserts the AFULL# output at T6. As a result, no more AWPCLK pulses are generated. However, the write control element will assert at most "3" (4-1) additional AWACK signals to allow each stage of the self-timed four-stage shift register to temporarily store data. In response to the AFULL# being asserted by the write control circuit at T14, the write control element generates the AWPCLK pulse to latch the data stored in the four-stage shift register into the first FIFO element. Thereafter, the shallow stream counter toggles the AWACK signal to commence servicing data transfer requests.

Figure 6A:
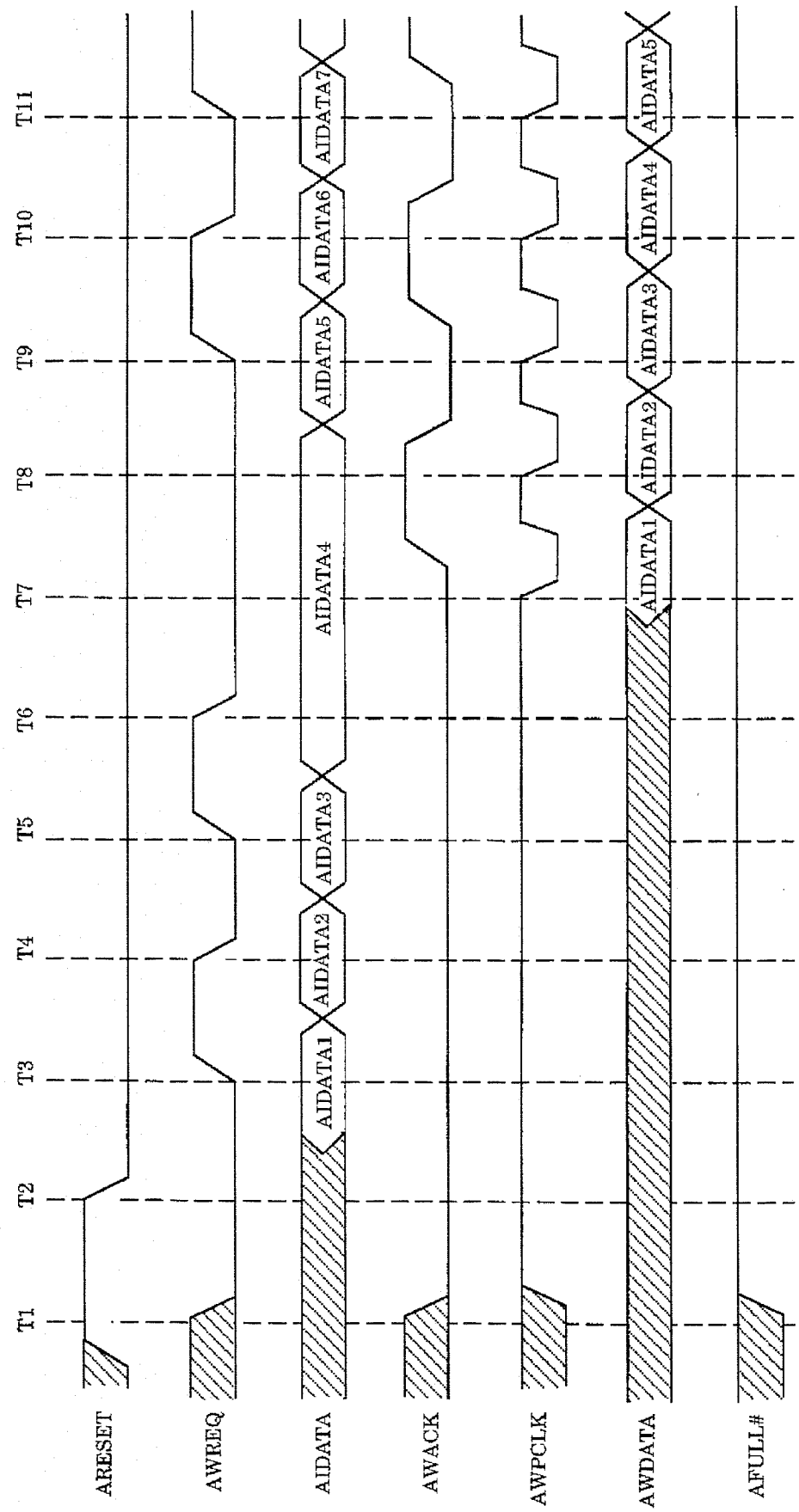
FIGS. 6A and 6B is a timing sequence diagram of the control and data signals of FIGS. 5A and 5B for the self-timed latch circuit undergoing a data transfer in stream mode.
Figure 6B:
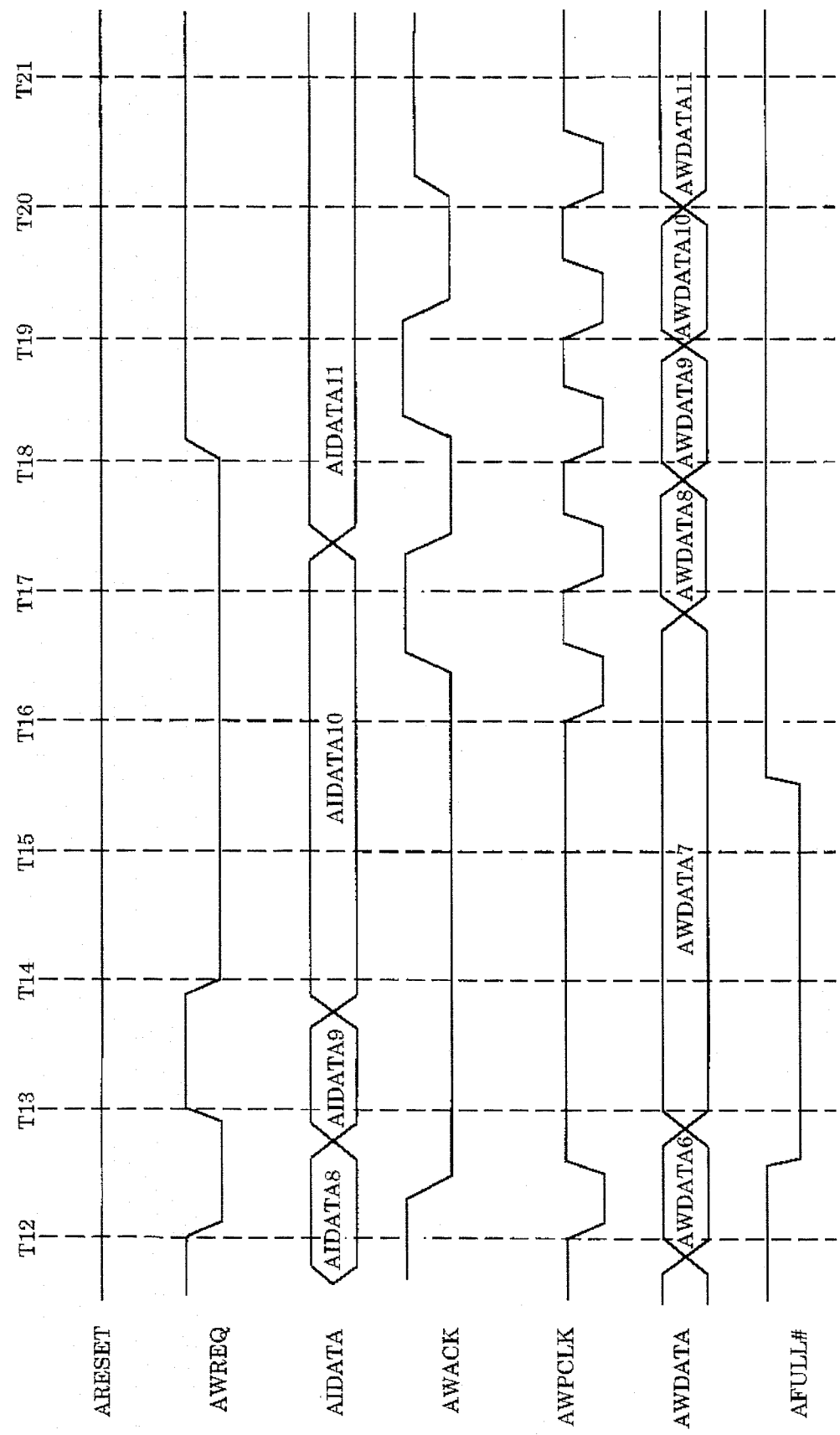

Referring now to FIGS. 6A and 6B, the timing sequence of the preferred embodiment of the AIM1 during stream mode is shown. At time unit T1, the ARESET signal is asserted to initialize the AIM1. At time unit T3, the NIC transmits a first AWREQ signal and corresponding data AIDATA1. At time units T4-T6, the NIC continues to toggle the request line generating a second, third and fourth AWREQ signals corresponding to AIDATA2, AIDATA3 and AIDATA4. These four data packets are stored in the four-stage shift register. Just prior to time unit T7, the AWDATA1 is latched by the first FIFO element and thereafter, an AWACK signal associated with the first AWREQ signal is toggled by the write control element to indicate that AWDATA1 has been latched. The AWACK signal is returned slower during stream mode because the AWACK signal is generated after the four-stage shift register.

Upon receipt of the AWACK signal, the NIC may assert another AWREQ signal as shown at approximately time unit T9. From time units T7-T12, data is being repeatedly latched into the first FIFO element. During time unit T12, however, the write control circuit de-asserts the AFULL# output indicating that the first FIFO element is almost full so as to preclude data from being written into the first FIFO element. However, since only two AWREQ signals are outstanding at time unit T12, the NIC may assert two more AWREQ signals during time unit T13 and T14 to fill the four-stage shift register with information packets associated with these AWREQ signals. The de-assertion of the AFULL# output precludes AWPCLK pulses from being asserted until after AFULL# output is asserted in order to avoid overfilling the first FIFO element as shown from T13-T15. Thereafter, both the AWACK signal and the AWPCLK pulses are generated to continue the data transfer as shown in time units T16-T20.

Figure 7:
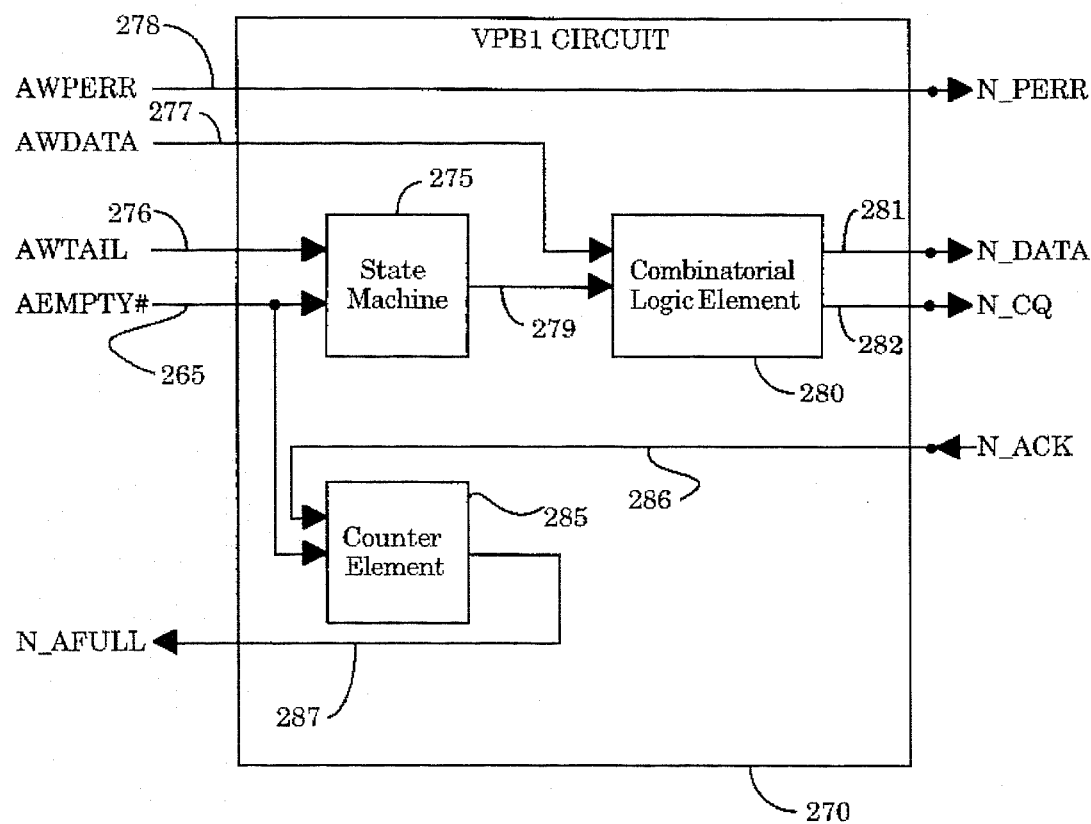
FIG. 7 is a block diagram of the first virtual pin buffer unit of FIG. 3 operating as an interface between the routing core and the first asynchronous interface module.

In order to maintain symmetry in design of the routing component, routing for all five directions (X+, X−, Y+, Y− and Z), the asynchronous interface 150 must be able to convert the signals and protocol of the processor node into the signals and protocol recognized by the communications network. The VPB1 circuit 270 enables such conversion. As shown in FIG. 7, the VPB1 circuit 270 includes a state machine 275 coupled to each bit slice of the first FIFO element through a first set of AIM1-to-VPB1 input lines 276 and is also coupled to the first control circuit 245 through the AEMPTY# control line 265. The first state machine 275 converts the AEMPTY# and AWTAIL signals read from the first FIFO element into a 2-bit signal labeled "N_CQ" to define the type of information input into the routing core and outputs the N_CQ information into a combinatorial logic element 280 through a first internal VPB1 line 279.

The VPB1 circuit 270 further includes the combinatorial logic element 280, including latches and multiplexers, to convert two sequential n-bit data packets synchronously read and transferred from the first FIFO element 240 via a second set of AIM1-to-VPB1 input line 277 during subsequent read operations. These AWDATA packets, being n-bits in length, are combined to form a m-bit network data ("N_DATA") packets, preferably 32-bits in length, utilized by the synchronous communications network. The N_CQs obtained from both read operations are decoded into a configuration recognized by the network, which in this case is 2-bits in length. It is contemplated, however, that the combinatorial logic element 280 may be configured to construct any size data packet used by the network. Both the N_DATA and N_CQ information is transmitted to the routing core through VPB1-to-Core output lines 281 and 282. The VPB1 circuit 270 additionally comprises a counter element 285 receiving as input the AEMPTY# signal through the AEMPTY# control line 265 and a network routing acknowledge ("N_ACK") signal through a first Core-to-VPB1 input line 286 to monitor whether a particular D-unit of the routing core is almost full and to assert a N_AFULL signal through a first VPB1-to-AIM1 output line 287 to the read control circuit 260 to suspend data transmission in the event that such conditions exist. In addition, the AWPERR signal propagates through a third set of AIM1-to-VPB1 input lines 278 directly to the routing core, being labeled in FIG. 7 as "N_PERR" bit, to indicate a parity error.

Figure 8:
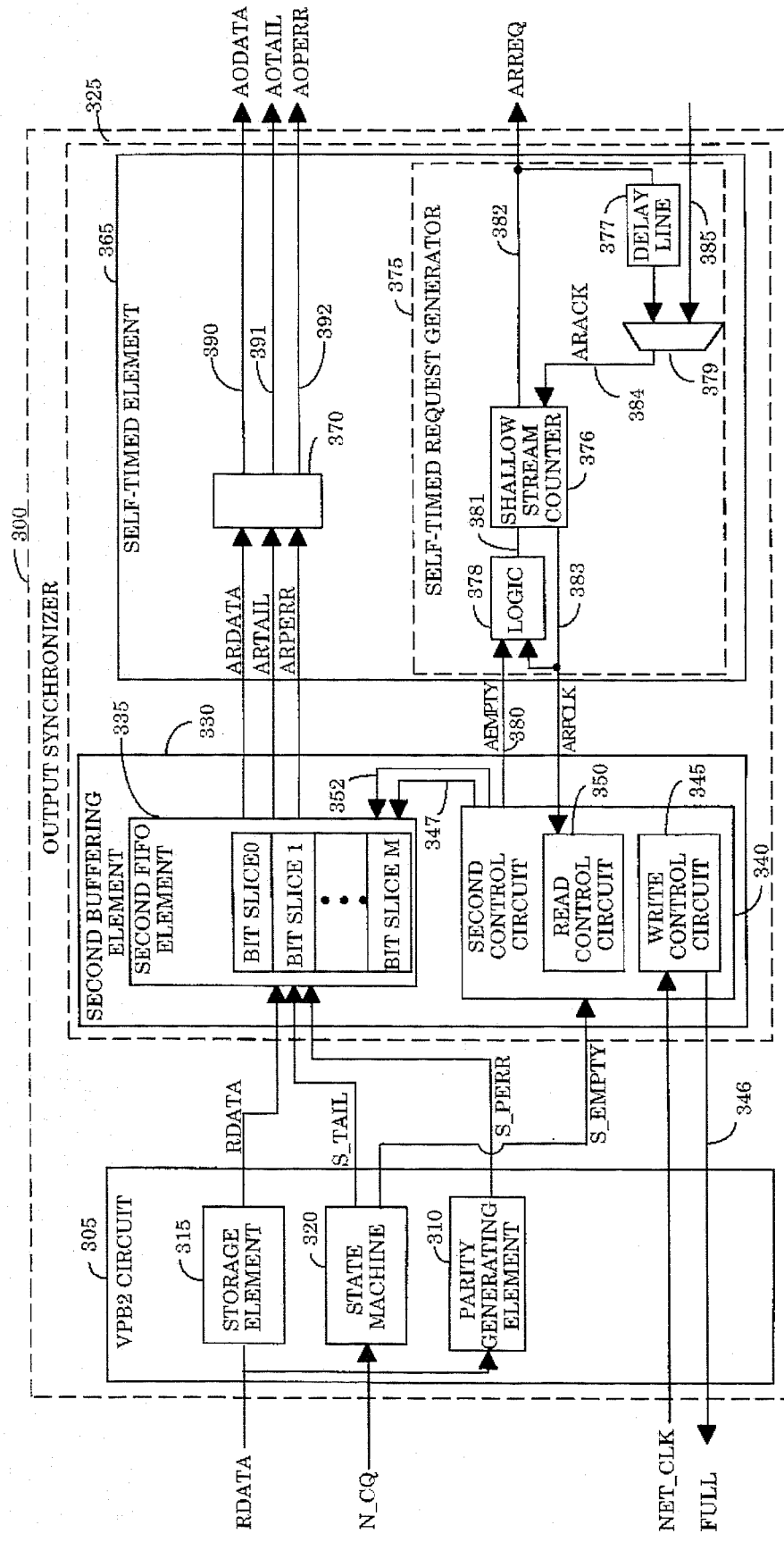
FIG. 8 is a block diagram of an embodiment of the output synchronizer comprising a second virtual pin buffer unit coupled to a second asynchronous interface module including a second buffering element and a self-timed request generator.

Referring now to FIG. 8, an illustrative embodiment of the output synchronizer 300 of the asynchronous interface 150 is shown. Converting synchronized data from the routing core into self-timed data for use by the NIC of the first local processing node, the output synchronizer 300 comprises a second virtual pin buffer ("VPB2") circuit 305 and a second asynchronous interface module ("AIM2") 325. The operating of the output synchronizer 300 is generally the reverse operation of the input synchronizer.

The VPB2 circuit 305 operates as an interface between the routing core and the AIM2 325 to regulate the flow of synchronized read data ("RDATA") packets, preferably 16-bits in length, between the routing core and a second FIFO element 335 employed within the AIM2 325. The VPB2 circuit 305 comprises a parity generating circuit 310 for attaching a parity bit to each n-bit data packet input from the routing core for later determination by the NIC if a transmission error occurred. The VPB2 circuit 305 further comprises a storage element 315 (e.g., a FIFO) and a state machine 320 for converting the synchronous "N_CQ" signals into (i) a synchronous TAIL (S_TAIL") bit indicating that its associated synchronous data packet is a final data packet of the data transfer and (ii) a synchronous EMPTY ("S_EMPTY") bit indicating that the data within the storage element 315 is valid before it is latched into the second FIFO element 335. The storage element 315 operates as a buffer for data transmission between the routing core and the second FIFO element 335 for timing purposes to prevent data loss.

The AIM2 325 comprises a second buffering element 330 and a self-timed element 365. The second buffering element 330 includes a second FIFO element 335 and a second control circuit 340 for controlling the second FIFO element 335. The second FIFO element 335 having a plurality of bit slices, which may be identical to the first FIFO element of FIG. 3, temporarily stores information transmitted from the routing core. The second control circuit 340 is implemented to select which bit slices of the second FIFO element 335 are available. Clocked by the NET_CLK, a write control circuit 345 of the second control circuit 340 maintains a write pointer which selects an available bit slice of the second FIFO element 335 through write pointer select lines 347 to temporarily store an information packet transmitted from the routing core. After writing the information packet into that bit slice, the write control circuit 345 advances the write pointer so that subsequent information packets are written into a different bit slices, provided the write control circuit 345 is not asserting a FULL signal line 346 informing the VPB2 circuit 305 to cease writing information into the second FIFO element 335 and to commence buffering any outstanding RDATA packets into the storage element 315. The second control circuit 340 further comprises a read control circuit 350, being asserted by an asynchronous read pointer clock ("ARPCLK") pulse, generated by a self-timed request generator 375 of the self-timed element 365, to maintain a read pointer selecting a bit slice to be read by the NIC through read pointer select lines 352. After selecting the contents of that bit slice, the read pointer is incremented to a next bit slice.

Figure 9:
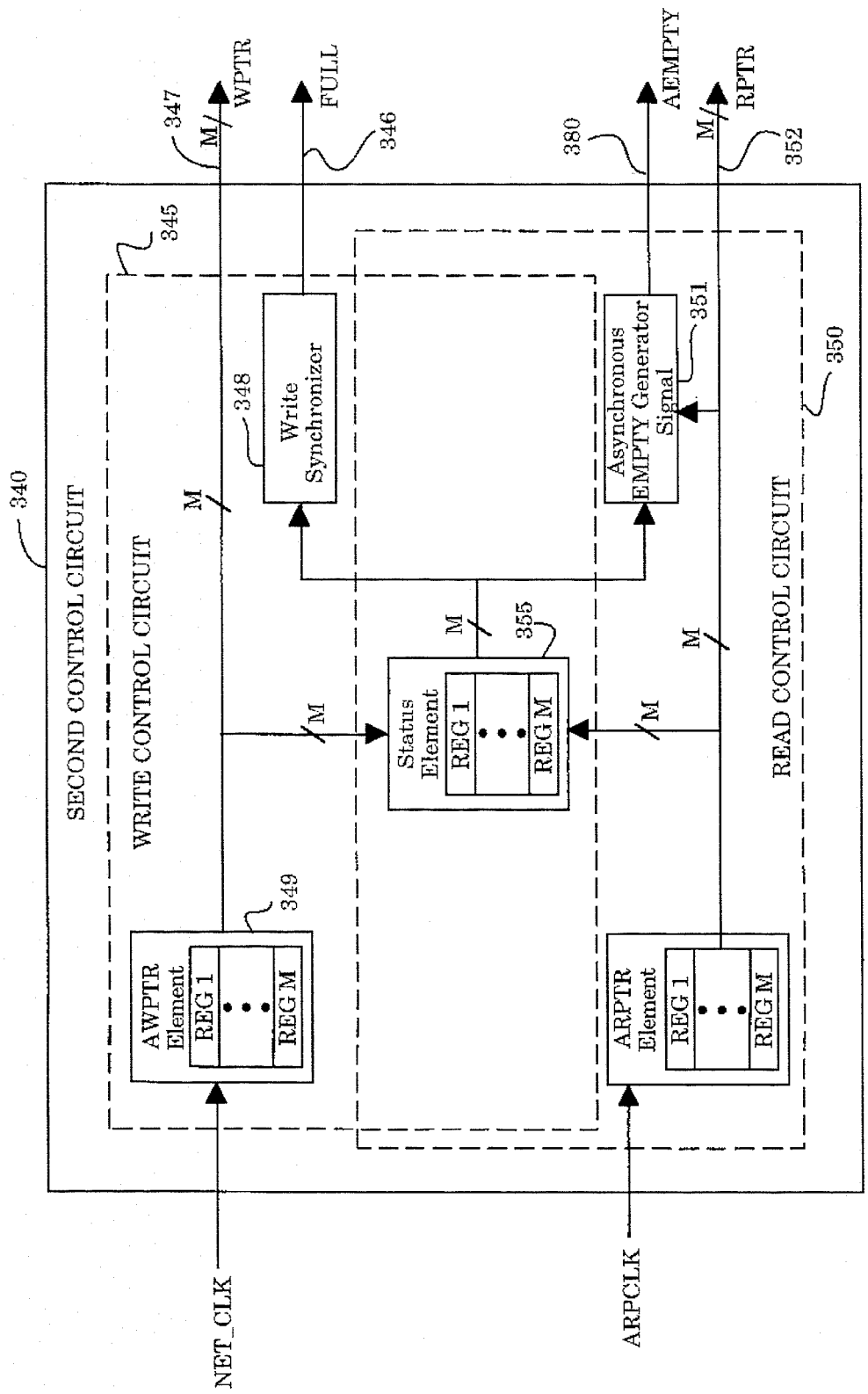
FIG. 9 is a block diagram of a second control circuit employed within the second asynchronous interface module of FIG. 8 for controlling information transmissions from the routing core of the first local routing component to the first local processor node.

Referring now to FIG. 9, an illustrative embodiment of the second control circuit 340 is shown. The second control circuit 340 is similar to the first control circuit 245 of FIG. 4, with the exception that the status element 355 is coupled to a write synchronizer 348 of the write control circuit 345 and an asynchronous EMPTY signal generator 351 of the read control circuit 350. The write synchronizer 348 includes a number of synchronizers which are initialized by an AWPTR element 349 and synchronizes the FULL signal line 346 if a predetermined number of status registers are set. This prevents the writing of information packets into the second FIFO element. The asynchronous EMPTY signal generator 351 sets an AEMPTY signal indicating to the self-timed request generator that the second FIFO element does not contain any valid information packets.

Referring back to FIG. 8, the self-timed element 365 includes a self-timed, single-stage shift register 370 for ensuring that data and requests are aligned properly and the self-timed request generator 375 for generating the ARPCLK pulse for clocking the second FIFO element 335 to read information associated with the bit slice selected by the read pointer. The self-timed signal generator 375 includes a shallow stream counter 376, a programmable delay line element 377, a logic element 378 (operating as an AND gate) and a selector 379.

Upon writing information into the second FIFO element 335, the read control circuit 350 de-asserts an AEMPTY signal. The de-asserted AEMPTY signal is input into the logic element 378 through a first input signal line 380 which causes a "low-level" logic signal to be input into the shallow stream counter 376 through a second input line 381. As a result of this low-level logic signal, the shallow stream counter 376 generates an asynchronous read request ("ARREQ") signal and inputs the ARREQ signal into the NIC through a third input line 382 and an asynchronous read clock ("CARPCLK") pulse input into the read control circuit through a first output signal line 383. The ARPCLK pulse causes information (data "AODATA", tail "AOTAIL" and parity "AOPERR") from the second FIFO element 335 to be latched into the single-stage shift register 370 and output to the NIC through lines 390-392, respectively. If in interlock mode, the shallow stream counter 376 cannot issue another ARREQ signal until it receives an acknowledge ("ARACK") signal through control line 384. In stream mode, however, the shallow stream counter 376 may issue up to four (or "N-1") outstanding requests until receipt acknowledging receipt of the first ARREQ signal. The selector 379 enables a programmable delay of the transmission of the acknowledge signal through a programmable delay line 385 or a delay line 386 external to the output synchronizer 300.

Figure 10:
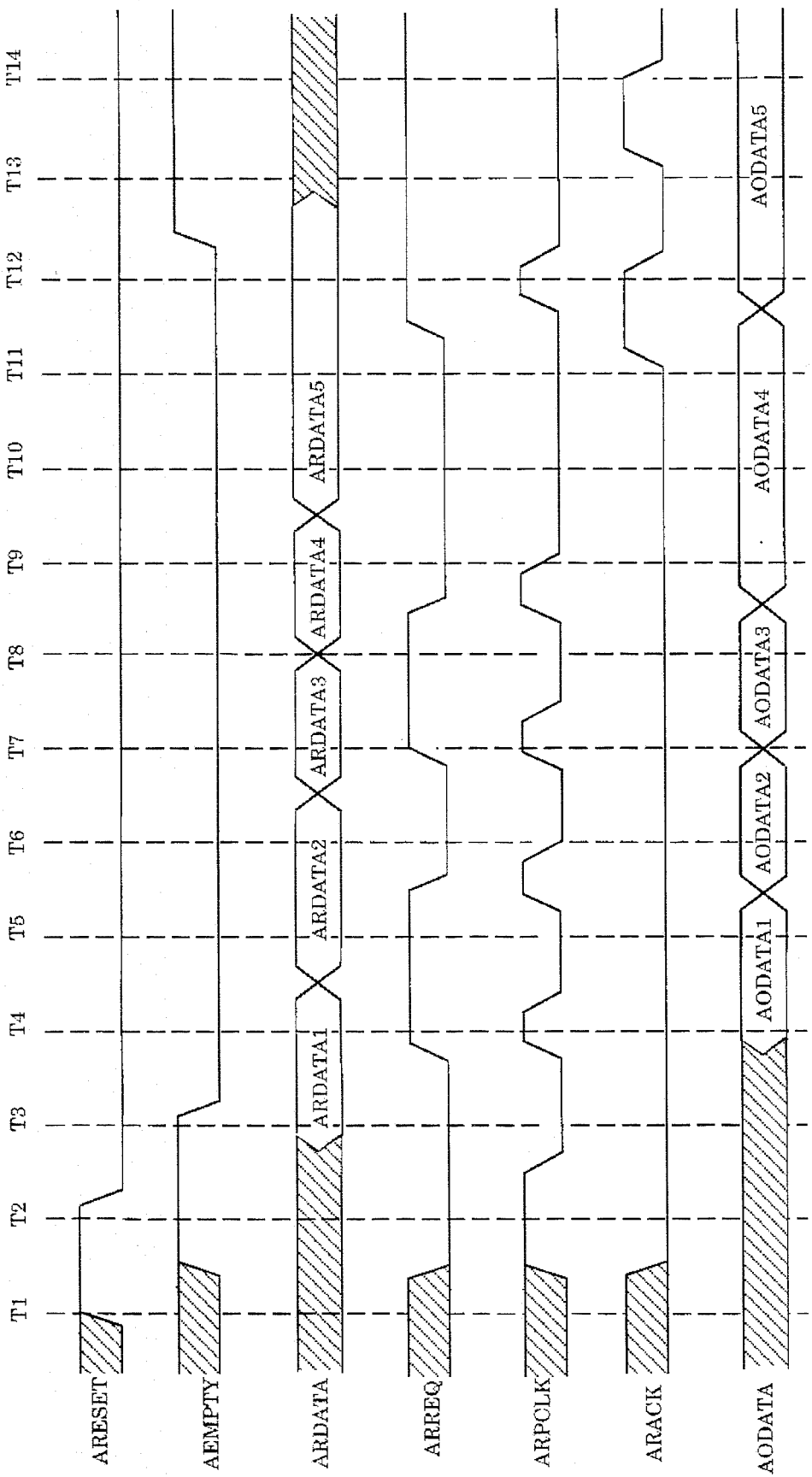
FIG. 10 is a timing sequence diagram of certain control and data signals of the self-timed request generator undergoing a data transfer in interlock mode.

Referring to FIG. 10, the timing sequences of the preferred embodiment of the AIM2 operating in the interlock mode is illustrated. As shown in time unit T1, the ARESET is asserted in order to reset the pointers as shown in the timing sequences of the AIM1 in FIGS. 5 and 6. After ARESET is de-asserted, an information packet from the VPB2 circuit is written into the second FIFO element causing the read control circuit to de-assert the AEMPTY signal as shown at time unit T4. The de-asserted AEMPTY signal causes the ARREQ signal, a level transition signal, to be toggled and the ARPCLK pulse to be input into the read control circuit. The ARREQ signal now clocks data output from the shift register into the NIC ("AODATA").

After time unit T5, on the rising edge of the ARPCLK pulse, the read pointer points to a particular bit slice to read an information packet, including ARDATA, stored therein. Concurrently with the generation of the ARPCLK pulse, ARDATA is latched into the self-timed shift register. Since AIM2 is operating in interlock mode, the self-timed request generator cannot transmit another ARREQ signal until the NIC generates an asynchronous read acknowledge ("ARACK") signal acknowledging receipt of AODATA1 associated with the ARREQ signal. As shown between time units T7-T10, a delay in the transmission of the ARACK signal delays the assertion of the ARPCLK pulse, a subsequent ARREQ signal and the latching of the ARDATA3 to produce AODATA3.

Upon generation of an ARPCLK pulse associated with the last AODATA packet read from the second FIFO element at time unit T12, the read control circuit asserts the AEMPTY signal indicating that only invalid information packets remain in the second FIFO element. However, AODATA4 is not read by the NIC until it generates an ARACK signal acknowledging receipt of AODATA4.

Figure 11:
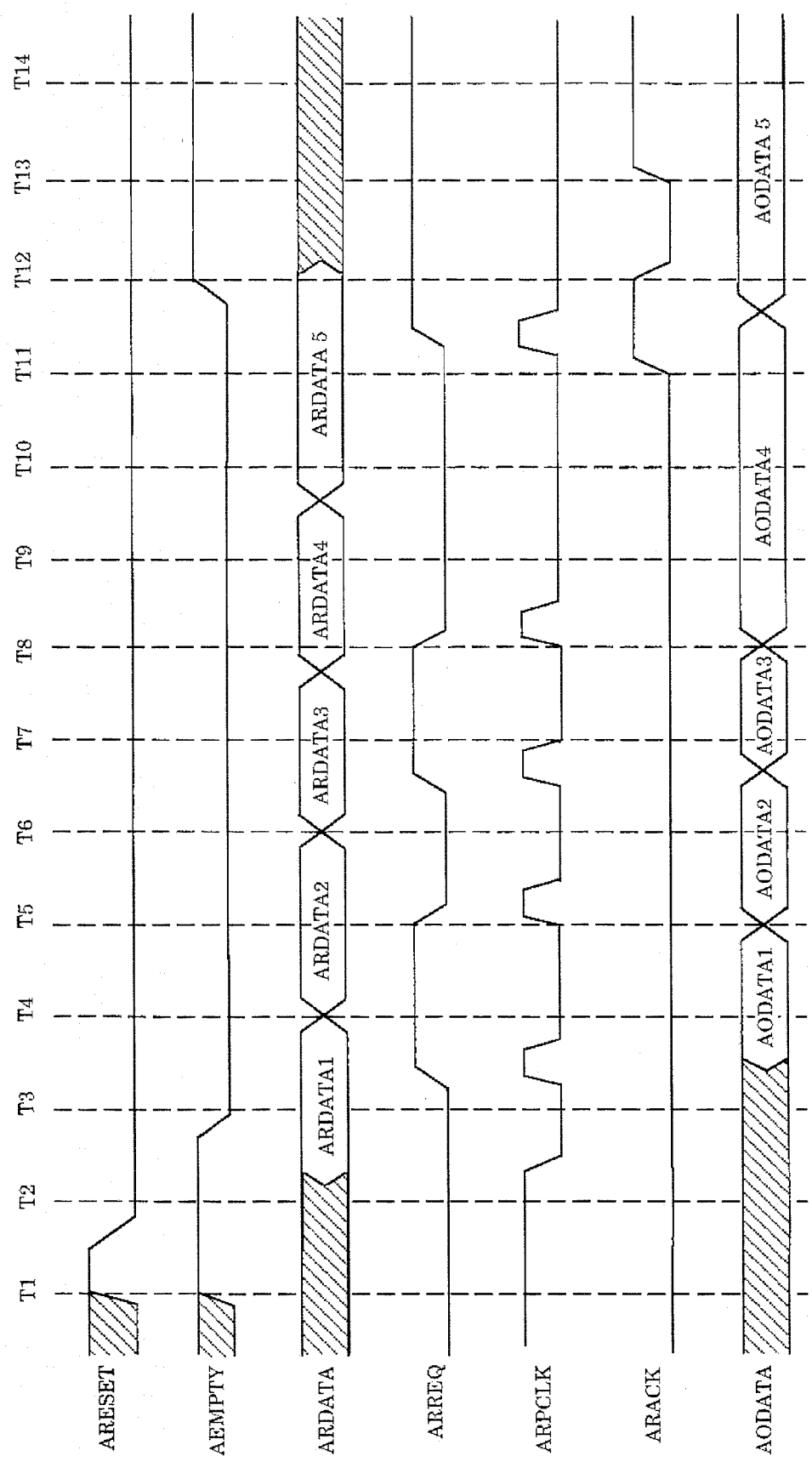
FIG. 11 is a timing sequence diagram of certain control and data signals of the self-timed request generator undergoing a data transfer in stream mode.

FIG. 11 illustrates the timing sequence of the AIM2 operating in the stream mode. At time unit T3, the ARREQ signal and an associated ARPCLK pulse are asserted after the AEMPTY signal is de-asserted. Thereafter, at time units T5-T8, the ARREQ signal is toggled to generate three additional outstanding ARREQ signals and ARPCLK pulses prior to receiving a first ARACK signal in order to input AODATA1-AODATA3 into the NIC. However, the input lines from the latch register to the NIC always contains the last valid AODATA packet, in this case AODATA4, until an ARACK signal is received by the self-timed request generator. The time delay between ARREQ signals is determined by the particular delay output from the selector.

At time unit T11, when the ARACK signal is received by the self-timed request generator, another ARREQ signal and ARPCLK pulse may be generated. At time unit T12, when all valid data is read from the second FIFO element, all ARDATA currently stored within the second FIFO element is invalid. As a result, the AEMPTY signal is asserted by the read control circuit in order to prevent invalid data from being read into the NIC. It is contemplated that AODATA5 is read upon receiving an associated ARACK signal.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, references to details of the preferred embodiment are not intended to limit the scope of the claims which in themselves recite only those features regarded as essential to the invention.

What is claimed is:

1. An asynchronous interface enabling a processor node operating at a first clocking frequency to transfer and receive information from a communications network operating at a second clocking frequency, the asynchronous interface comprising:

input synchronizing means for asynchronously receiving a first plurality of information packets from the first device and for synchronously transmitting said first plurality of information packets into the communications network, said input synchronizing means includes first asynchronous interface means for storing said first plurality of information packets being transmitted from the first device and for transmitting said first plurality of information packets to the communications network, said first asynchronous interface means including:

first storage means for storing said first plurality of information packets, first control means, being coupled to said first storage means through at least two select lines, for controlling writing of said first plurality of information packets into said first storage means through a write pointer and reading of said first plurality of information packets from said first storage means through a read pointer, write generating means, being coupled to said first control means through a write clocking line, for signaling said first control means via said write clocking line to advance said write pointer so that said first plurality of information packets are sequentially written into said first storage means, and first buffer means for converting said first plurality of information packets into a corresponding plurality of packets readable by the communications network, said first buffer means being coupled to said first storing means and said first control means; and output synchronizing means for synchronously receiving a second plurality of information packets from the communications network and for asynchronously transferring said second plurality of information packets into the first device, said output synchronizing means being coupled between the communications network and the first device.

2. The asynchronous interface according to claim 1, wherein said storage means includes a FIFO element including a plurality of bit slices, each of said plurality of bit slices storing at least one packet of said first plurality of information packets.

3. The asynchronous interface according to claim 2, wherein said write generating means, being further coupled to the first device through a request line and an acknowledge line, generates and transmits (i) an asynchronous write pulse into said first control means through said write clocking line for advancing said write pointer and (ii) an acknowledge signal through said acknowledge line, said asynchronous write pulse and said acknowledge signal are in response to an asynchronous write request previously transmitted through said request line by the first device.

4. The asynchronous interface according to claim 3, wherein said write generating means, being further coupled to said first control means through a first control line, ceases to generate said asynchronous write pulse in order to prevent further storing of said first plurality of information packets into said first storage means upon receiving a de-asserted first control signal transmitted from said first control means through said first control line.

5. The asynchronous interface according to claim 4, wherein said first control means includes:

a write control circuit for selecting one of said plurality of bit slices to store at least one of said first plurality of information packets therein and for de-asserting said first control signal upon determining that a predetermined number of said plurality of bit slices are currently storing at least one of said first plurality of information packets unread by said first buffer means; and a read control circuit for controlling transmission of said first plurality of information packets from said plurality of bit slices by said read control circuit (i) selecting at least one of said plurality of bit slices to transmit at least one of said first plurality of information packets stored therein, (ii) preventing said first plurality of information packets currently stored within said first storage means from being transmitted into said first buffer means in response to a second control signal and (iii) signaling to said first buffer means that said first storage means is not currently storing at least one of said first plurality of information packets unread by said first buffer means.

6. The asynchronous interface according to claim 5, wherein said first asynchronous interface means further includes second storage means for temporarily storing a preselected number "N" of information packets transmitted from the first device, wherein "N" is a whole number greater than one.

7. The asynchronous interface according to claim 6, wherein said write generating means, in response to said first control means de-asserting said first control signal, generates up to "N-1" acknowledge signals enabling said second storage means to store "N" of said first plurality of information packets.

8. The asynchronous interface according to claim 1, wherein said output synchronizing means includes second buffer means for synchronously transmitting said second plurality of information packets from the communications network into a second asynchronous interface means;

said second asynchronous interface means for storing said second plurality of information packets and for asynchronously transmitting said second plurality of information packets into the first device, said second asynchronous interface means includes third storage means for storing said second plurality of information packets, said third storage means being coupled to said second buffer means and the first device to enable said second plurality of information packets to propagate from the communications network to the first device, second control means, coupled to said third storage means through a plurality of select lines and said second buffer means through a third control line, for controlling writing of said second plurality of information packets into said third storage means through a second write pointer and reading of said second plurality of information packets from said third storage means through a second read pointer, and request generating means, coupled to the first device through a request and acknowledge line and to said second control means through a read clock line and a fourth control line, for transmitting an asynchronous read request signal into the first device.

9. The asynchronous interface according to claim 8, wherein said third storage means includes a FIFO element including a plurality of bit slices where each of said plurality of bit slices stores at least one information packet.

10. The asynchronous interface according to claim 9, wherein said second control means includes a write control circuit for selecting one of said plurality of bit slices to store at least one of said second plurality of information packets therein and for transmitting an asserted third control signal through said third control signal line upon determining that at least a predetermined number of said plurality of bit slices are currently storing at least one information packet unread by the first device; and a read control circuit for controlling transmission of said second plurality of information packets by selecting at least one of said plurality of bit slices to transmit at least one of said first plurality of information packets stored therein and for generating and transmitting a fourth control signal through said fourth control line to indicate that said third storage means is storing at least one of said second plurality of information packets unread by the first device.

11. The asynchronous interface according to claim 10, wherein said request generating means generates and transmits (i) said asynchronous read request signal to indicate to the first device that one of said second plurality of information packets is available to be read and (ii) an asynchronous read clock pulse into said read control circuit to advance said second read pointer, said asynchronous read request signal and said asynchronous read clock pulse are in response to said fourth control signal.

12. The asynchronous interface according to claim 11, wherein said request generating means temporarily ceases to generate said asynchronous read request signal upon said fourth control signal being de-asserted by said second control means.

13. The asynchronous interface according to claim 12, wherein upon generating said asynchronous read request signal, said request generating means must receive an acknowledge signal corresponding to said asynchronous read request signal before generating a subsequent asynchronous read request signal.

14. The asynchronous interface according to claim 13, wherein said request generating means may generate up to "N-1" outstanding asynchronous read request signals before receipt of an acknowledge signal corresponding to a previous asynchronous read request signal, provided said first asynchronous interface means further includes second storage means for temporarily storing a preselected number "N" of information packets transmitted from the first device, wherein "N" is a whole number greater than one.

15. An asynchronous interface enabling a processor node operating at a first clocking frequency to transfer and receive information from a communications network operating at a second clocking frequency, the asynchronous interface comprising:

an input synchronizer which asynchronously receives a first plurality of information packets from the processor node and synchronously transmits said first plurality of information packets into the communications network, said input synchronizer includes a first asynchronous element which contains said first plurality of information packets being transmitted from the processor node and transmits said first plurality of information packets to the communications network, said first asynchronous element including a first FIFO element which contains said first plurality of information packets, said first FIFO element including a plurality of bit slices, a first control circuit, being coupled to said first FIFO element through at least two select lines, which controls writing of said first plurality of information packets into said first FIFO element through a write pointer and reads said first plurality of information packets from said first FIFO element through a read pointer, a write control element, being coupled to said first control circuit through a write clocking line, which signals said first control circuit via said write clocking line to advance said write pointer so that said first plurality of information packets are sequentially written into said first FIFO element, and a first virtual pin buffer which converts said first plurality of information packets into a corresponding plurality of packets readable by the communications network, said first virtual pin buffer being coupled to said first FIFO element and said first control circuit; and an output synchronizer which synchronously receives a second plurality of information packets from the communications network and asynchronously transfers said second plurality of information packets into the processor node, said output synchronizer being coupled between the communications network and the processor node.

16. The asynchronous interface according to claim 15, wherein said write control element, being further coupled to the processor node through a request line and an acknowledge line and to said first control circuit through a first control line, (i) generates and transmits an asynchronous write pulse into said first control circuit through said write clocking line in order to advance said write pointer and an acknowledge signal through said acknowledge line, said asynchronous write pulse and said acknowledge signal are in response to an asynchronous write request previously transmitted through said request line by the processor node, and (ii) refrains from generating said asynchronous write pulse in order to prevent further storing of said first plurality of information packets into said first FIFO element upon receiving a de-asserted first control signal transmitted from said first control circuit through said first control line.

17. The asynchronous interface according to claim 16, wherein said first control circuit includes a write control circuit which selects one of said plurality of bit slices to store at least one of said first plurality of information packets therein and de-asserts said first control signal upon determining that a predetermined number of said plurality of bit slices are currently storing at least one of said first plurality of information packets unread by said first virtual pin buffer; and a read control circuit which controls transmission of said first plurality of information packets from said plurality of bit slices by said read control circuit (i) selecting at least one of said plurality of bit slices to transmit at least one of said first plurality of information packets stored therein, (ii) preventing said first plurality of information packets currently stored within said first FIFO element from being transmitted into said first virtual pin buffer in response to a second control signal and (iii) signaling to said first virtual pin buffer that said first FIFO element is not currently storing at least one of said first plurality of information packets unread by said first virtual pin buffer.

18. The asynchronous interface according to claim 17, wherein said first asynchronous element further includes a second storage element which temporarily contains a preselected number "N" of information packets transmitted from the first device, wherein "N" is a whole number greater than one.

19. The asynchronous interface according to claim 18, wherein said write control element, in response to said first control circuit de-asserting said first control signal, generates up to "N-1" acknowledge signals enabling said second storage element to store "N" of said first plurality of information packets.

20. The asynchronous interface according to claim 15, wherein said output synchronizer includes a second virtual pin buffer which synchronously transmits said second plurality of information packets from the communications network into a second asynchronous element; and said second asynchronous element which contains said second plurality of information packets and asynchronously transmits said second plurality of information packets into the processor node, said second asynchronous element includes a second FIFO element which contains said second plurality of information packets, said second FIFO element including a plurality of bit slices, a second control circuit, coupled to said second FIFO element through a plurality of select lines and said virtual pin buffer through a third control line, which controls writing of said second plurality of information packets into said second FIFO element through a second write pointer and reading of said second plurality of information packets from said second FIFO element through a second read pointer, and a request generator, coupled to the processor node through a request and acknowledge line and to said second control circuit through a read clock line and a fourth control line, which transmits an asynchronous read request signal into the processor node.

21. The asynchronous interface according to claim 20, wherein said second control circuit includes a write control circuit which selects one of said plurality of bit slices to store at least one of said second plurality of information packets therein and transmits an asserted third control signal through said third control signal line upon determining that at least a predetermined number of said plurality of bit slices currently contain at least one information packet unread by the processor node; and a read control circuit which (i) controls transmission of said second plurality of information packets by selecting at least one of said plurality of bit slices to transmit at least one of said first plurality of information packets stored therein and (ii) generates and transmits a fourth control signal through said fourth control line to indicate that said second FIFO element contains at least one of said second plurality of information packets unread by the processor node.

22. The asynchronous interface according to claim 21, wherein said request generator generates and transmits (i) said asynchronous read request signal to indicate to the processor node that one of said second plurality of information packets is available to be read and (ii) an asynchronous read clock pulse into said read control circuit to advance said second read pointer, said asynchronous read request signal and said asynchronous read clock pulse are in response to said fourth control signal.

23. The asynchronous interface according to claim 22, wherein said request generator temporarily ceases to generate said asynchronous read request signal upon said fourth control signal being de-asserted by said second control circuit.

24. A network operating at a first clocking frequency, said network comprising:

a plurality of processor nodes, wherein each processor node includes a central processing unit;

a plurality of routing components for providing an electrical coupling between at least a first processor node of said plurality of processor nodes and a second processor node of said plurality of processor nodes through at least one interconnect line, wherein a first routing component of said plurality of routing components, coupled to said first processor node and at least a second routing component of said plurality of routing components which is coupled to said second processor node, said first routing component, includes an routing element to route messages input into said first routing component to said second routing component or alternatively to an asynchronous interface, said routing element operating at said first clocking frequency; and said asynchronous interface, coupled to said routing element, to enable said first processor node operating at a second clocking frequency to transfer and receive information from said routing element, said asynchronous interface including an input synchronizer which asynchronously receives a first plurality of information packets from said first processor node and synchronously transmits said first plurality of information packets into said routing element, said input synchronizer being coupled between said first processor node and said routing element, and an output synchronizer which synchronously receives a second plurality of information packets from said routing element and asynchronously transfers said second plurality of information packets into said first processor node, said output synchronizer being coupled between said routing element and said first processor node.

25. The asynchronous interface according to claim 24, wherein said input synchronizer includes first asynchronous element which contains said first plurality of information packets being transmitted from said first processor node and transmits said first plurality of information packets to said routing element, said first asynchronous element includes a first FIFO element for which contains first plurality of information packets, said first FIFO element including a plurality of bit slices, a first control circuit, being coupled to said first FIFO element through at least two select lines, which controls writing of said first plurality of information packets into said first FIFO element through a write pointer and reading of said first plurality of information packets from said first FIFO element through a read pointer, and write control element, being coupled to said first control circuit through a write clocking line, which signals said first control circuit via said write clocking line to advance said write pointer so that said first plurality of information packets are sequentially written into said first FIFO element; and first virtual pin buffer which converts said first plurality of information packets into a corresponding plurality of packets readable by said routing element, said first virtual pin buffer being coupled to said first FIFO element and said first control circuit.

26. The asynchronous interface according to claim 25, wherein said write control element, being further coupled to said first processor node through a request line and an acknowledge line and to said first control circuit through a first control line, (i) generates and transmits an asynchronous write pulse into said first control circuit through said write clocking line in order to advance said write pointer and an acknowledge signal through said acknowledge line, said asynchronous write pulse and said acknowledge signal are in response to an asynchronous write request previously transmitted through said request line by said first processor node, and (ii) refrains from generating said asynchronous write pulse in order to prevent further storing of said first plurality of information packets into said first FIFO element upon receiving a de-asserted first control signal transmitted from said first control circuit through said first control line.

27. The asynchronous interface according to claim 26, wherein said first control circuit includes a write control circuit which selects one of said plurality of bit slices to store at least one of said first plurality of information packets therein and deasserts said first control signal upon determining that a predetermined number of said plurality of bit slices are currently storing at least one of said first plurality of information packets unread by said first virtual pin buffer; and a read control circuit which controls transmission of said first plurality of information packets from said plurality of bit slices by said read control circuit (i) selecting at least one of said plurality of bit slices to transmit at least one of said first plurality of information packets stored therein, (ii) preventing said first plurality of information packets currently stored within said first FIFO element from being transmitted into said first virtual pin buffer in response to a second control signal and (iii) signaling to said first virtual pin buffer that said first FIFO element is not currently storing at least one of said first plurality of information packets unread by said first virtual pin buffer.

28. The asynchronous interface according to claim 27, wherein said first asynchronous element further includes a second storage element which temporarily contains a preselected number "N" of information packets transmitted from the first processor node, wherein "N" is a whole number greater than one.

29. The asynchronous interface according to claim 28, wherein said write control element, in response to said first control circuit de-asserting said first control signal, generates up to "N-1" acknowledge signals enabling said second storage element to store "N" of said first plurality of information packets.

30. The asynchronous interface according to claim 25, wherein said output synchronizer includes a second virtual pin buffer which synchronously transmits said second plurality of information packets from said routing element into a second asynchronous element; and said second asynchronous element which contains said second plurality of information packets and asynchronously transmits said second plurality of information packets into said first processor node, said second asynchronous element including a second FIFO element which contains said second plurality of information packets, said second FIFO element including a plurality of bit slices, a second control circuit, coupled to said second FIFO element through a plurality of select lines and said virtual pin buffer through a third control line, which controls writing of said second plurality of information packets into said second FIFO element through a second write pointer and reading of said second plurality of information packets from said second FIFO element through a second read pointer, and a request generator, coupled to said first processor node through a request and acknowledge line and to said second control circuit through a read clock line and a fourth control line, [for transmitting] which transmits an asynchronous read request signal into said first processor node.

31. The asynchronous interface according to claim 30, wherein said second control circuit includes a write control circuit which selects one of said plurality of bit slices to contains at least one of said second plurality of information packets therein and transmits an asserted third control signal through said third control signal line upon determining that at least a predetermined number of said plurality of bit slices are currently storing at least one information packet unread by said first processor node; and a read control circuit which controls transmission of said second plurality of information packets by selecting at least one of said plurality of bit slices to transmit at least one of said first plurality of information packets stored therein and generates and transmits a fourth control signal through said fourth control line to indicate that said second FIFO element is storing at least one of said second plurality of information packets unread by said first processor node.

32. The asynchronous interface according to claim 31, wherein said request generator generates and transmits (i) said asynchronous read request signal to indicate to said first processor node that one of said second plurality of information packets is available to be read and (ii) an asynchronous read clock pulse into said read control circuit to advance said second read pointer, said asynchronous read request signal and said asynchronous read clock pulse are in response to said fourth control signal.

33. The asynchronous interface according to claim 32, wherein said request generator temporarily ceases to generate said asynchronous read request signal upon said fourth control signal being de-asserted by said second control circuit.

34. A network operating at a first clocking frequency, said network comprising:

a plurality of processor nodes;

a plurality of routing components for providing an electrical coupling between at least a first processor node of said plurality of processor nodes and a second processor node of said plurality of processor nodes through at least one interconnect line, wherein a first routing component of said plurality of routing components, coupled to said first processor node and at least a second routing component of said plurality of routing components which is coupled to said second processor node, said first routing component includes routing means for determining whether a message input into said first routing component is routed to said second routing component or alternatively to an asynchronous interface means, said routing means operating at said first clocking frequency; and said asynchronous interface means, coupled to said routing means, for enabling said first processor node operating at a second clocking frequency to transfer and receive information from said routing means, said asynchronous interface means comprising:

input synchronizing means for asynchronously receiving a first plurality of information packets from said first processor node and for synchronously transmitting said first plurality of information packets into said routing means, said input synchronizing means being coupled between said first processor node and said routing means, and an output synchronizing means for synchronously receiving a second plurality of information packets from said routing means and for asynchronously transferring said second plurality of information packets into said first processor node, said output synchronizing means being coupled between said routing means and said first processor node.

35. A method for transferring information between a first device operating at a first clocking frequency and a communications network, employing the first device, operating at a second clocking frequency, wherein the first clocking frequency has no relationship with the second clocking frequency, the method comprising the steps of:

receiving a first plurality of information packets which has been asynchronously transferred from the first device;

transmitting said first plurality of information packets synchronously at the second clocking frequency to the communications network, said transmitting step includes the steps of sequentially storing said first plurality of information packets, and converting said first plurality of information packets into a plurality of packets readable by the communications network at the second clocking frequency;

receiving a second plurality of information packets which has been synchronously transferred from the network;

temporarily storing said second plurality of information packets; and transmitting said second plurality of information packets asynchronously to the first device.

36. An asynchronous interface enabling a first device operating at a first clocking frequency to transfer and receive information from a communications network operating at a second clocking frequency, the asynchronous interface comprising:

input synchronizing means for asynchronously receiving a first plurality of information packets from the first device and for synchronously transmitting said first plurality of information packets into the communications network, said input synchronizing means includes first asynchronous interface means, coupled to the first device, for storing said first plurality of information packets and for transmitting said first plurality of information packets to the communication network, and first buffer means, coupled to said first asynchronous interface means and the communications network, for converting said first plurality of information packets into a corresponding plurality of packets readable by the communications network; and output synchronizing means for synchronously receiving a second plurality of information packets from the communications network and for asynchronously transferring said second plurality of information packets into the first device, said output synchronizing means being coupled between the communications network and the first device.

37. An asynchronous interface enabling a processor node operating at a first clocking frequency to transfer and receive information from a communications network operating at a second clocking frequency, the asynchronous interface comprising:

an input synchronizer which asynchronously receives a first plurality of information packets from the processor node and synchronously transmits said first plurality of information packets into the communications network, said input synchronizer being coupled between the processor node and the communications network; and an output synchronizer, coupled to said input synchronizer, which synchronously receives a second plurality of information packets from the communications network and asynchronously transfers said second plurality of information packets into the processor node, said output synchronizer includes a virtual pin buffer which synchronously transmits said second plurality of information packets from the communications network into an asynchronous element, and said asynchronous element which stores said second plurality of information packets and asynchronously transmits said second plurality of information packets into the processor node.

* * * * *

UNITED STATES PATENT AND TRADEMARK OFFICE
CERTIFICATE OF CORRECTION

PATENT NO.   :   5,539,739
DATED        :   July 23, 1996
INVENTOR(S)  :   Dike et al.

It is certified that error appears in the above-identified patent and that said Letters Patent is hereby corrected as shown below:

In column 13 at line 21 delete "("CARPCLK")" and insert --("ARPCLK")--

Signed and Sealed this

Fifth Day of November, 1996

Attest:

BRUCE LEHMAN

Attesting Officer          Commissioner of Patents and Trademarks